US007215786B2

(12) United States Patent
Nakadai et al.

(10) Patent No.: US 7,215,786 B2
(45) Date of Patent: May 8, 2007

(54) ROBOT ACOUSTIC DEVICE AND ROBOT ACOUSTIC SYSTEM

(75) Inventors: Kazuhiro Nakadai, Chiba (JP); Hiroshi Okuno, Tokyo (JP); Hiroaki Kitano, Saitama (JP)

(73) Assignee: Japan Science and Technology Agency, Saitama (JP)

( * ) Notice: Subject to any disclaimer, the term of this patent is extended or adjusted under 35 U.S.C. 154(b) by 874 days.

(21) Appl. No.: 10/296,244

(22) PCT Filed: Jun. 8, 2001

(86) PCT No.: PCT/JP01/04858

§ 371 (c)(1),
(2), (4) Date: Dec. 6, 2002

(87) PCT Pub. No.: WO01/95314

PCT Pub. Date: Dec. 13, 2001

(65) Prior Publication Data

US 2003/0139851 A1 Jul. 24, 2003

(30) Foreign Application Priority Data

Jun. 9, 2000 (JP) ............................. 2000-173915

(51) Int. Cl.
*H04B 15/00* (2006.01)
*H04R 1/02* (2006.01)
*B25J 5/00* (2006.01)

(52) U.S. Cl. ......................... 381/94.1; 381/92; 901/50; 318/568.12

(58) Field of Classification Search ................ 700/245, 700/246, 250; 381/71.1, 71.7, 94.1–94.3, 381/94.8, 91, 92, 122; 901/50; 318/568.4, 318/568.12, 568.13, 568.16–568.17
See application file for complete search history.

(56) References Cited

U.S. PATENT DOCUMENTS 5,049,796 A * 9/1991 Seraji ...................... 318/568.1

(Continued)

FOREIGN PATENT DOCUMENTS

JP 11-041577 2/1999

OTHER PUBLICATIONS

H. G. Okuno et al.; JSAI Technical Report, Proceedings of the Seventh Meeting of Special Interest Group on AI Challenges, SIG-Challenge-9907-10, pp. 61-65, Nov. 2, 1999. Japanese Society for Artificial Intelligence. See PCT search report.

T. Kikuchi et al.; IEICE Technical Report, vol. 98, No. 534, DSP98-164, pp. 23-28, Jan. 22, 1999. The Institute of Electronics, Information and Communications Engineers. See PCT search report.

(Continued)

*Primary Examiner*—Xu Mei
(74) *Attorney, Agent, or Firm*—Westerman, Hattori, Daniels & Adrian, L.L.P.

(57) ABSTRACT

A robot auditory apparatus and system are disclosed which are made capable of attaining active perception upon collecting a sound from an external target with no influence received from noises generated interior of the robot such as those emitted from the robot driving elements. The apparatus and system are for a robot having a noise generating source in its interior, and include: a sound insulating cladding (14) with which at least a portion of the robot is covered; at least two outer microphones (16 and 16) disposed outside of the cladding (14) for collecting an external sound primarily; at least one inner microphone (17) disposed inside of the cladding (14) for primarily collecting noises from the noise generating source in the robot interior; a processing section (23, 24) responsive to signals from the outer and inner microphones (16 and 16; and 17) for canceling from respective sound signals from the outer microphones (16 and 16), noises signal from the interior noise generating source and then issuing a left and a right sound signal; and a directional information extracting section (27) responsive to the left and right sound signals from the processing section (23, 24) for determining the direction from which the external sound is emitted. The processing section (23, 24) is adapted to detect burst noises owing to the noise generating source from a signal from the at least one inner microphone (17) for removing signal portions from the sound signals for bands containing the burst noises.

25 Claims, 19 Drawing Sheets

U.S. PATENT DOCUMENTS

| | | | | |
|---|---|---|---|---|
| 5,521,600 | A * | 5/1996 | McEwan | 342/27 |
| 5,978,490 | A * | 11/1999 | Choi et al. | 381/92 |
| 6,549,630 | B1 * | 4/2003 | Bobisuthi | 381/94.7 |
| 7,016,505 | B1 * | 3/2006 | Nakadai et al. | 381/71.1 |
| 2002/0181723 | A1 * | 12/2002 | Kataoka | 381/92 |
| 2003/0133577 | A1 * | 7/2003 | Yoshida | 381/56 |
| 2004/0175006 | A1 * | 9/2004 | Kim et al. | 381/92 |
| 2005/0195989 | A1 * | 9/2005 | Sato et al. | 381/92 |

OTHER PUBLICATIONS

S. Nakamura et al.; The Heisei—7 Spring Meeting of the Acoustical Society of Japan, vol. 1, 1-5-8, pp. 15-16, Mar. 14, 1995. The Acoustical Society of Japan. See PCT search report.

* cited by examiner (A)

(B)

(A)

(B)

( A )

( B )

ROBOT ACOUSTIC DEVICE AND ROBOT ACOUSTIC SYSTEM

TECHNICAL FIELD

The present invention relates to an auditory apparatus for a robot and, in particular, for a robot of human type ("humanoid") and animal type ("animaloid").

BACKGROUND ART

For robots of human and animal types, attention has in recent years been drawn to active senses of vision and audition. A sense by a sensory device provided in a robot for its vision or audition is made active (active sensory perception) when a portion of the robot such as its head carrying the sensory device is varied in position or orientation as controlled by a drive means in the robot so that the sensory device follows the movement or instantaneous position of a target to be sensed or perceived.

As for active vision, studies have diversely been undertaken using an arrangement in which at least a camera as the sensory device holds its optical axis directed towards a target by being controlled in position by the drive means while permitting itself to perform automatic focusing and zooming in and out relative to the target to take a picture thereof As for active audition or hearing, at least a microphone as the sensory device may likewise have its facing kept directed towards a target by being controlled in position by the drive mechanism to collect a sound from the target. An inconvenience has been found to occur then with the active audition, however. To wit, with the drive mechanism in operation, the microphone may come to pick up a sound, especially burst noises, emitted from the working drive means. And such sound as a relatively large noise may become mixed with a sound from the target, thereby making it hard to precisely recognize the sound from the target.

And yet, auditory studies made on the limited state that the drive means in the robot is at a halt have been found not to stand especially with the situation that the target is moving and hence unable to give rise to what is called active audition by having the microphone follow the movement of the target.

Yet further, the microphone as the auditory device may come to pick up not only the sound from the drive means but also various sounds of actions generated interior of the robot and noises steadily emitted from its inside, thereby making it hard to provide consummate active audition.

By the way, there has been known an active noise control (ANC) method designed to cancel a noise.

In the ANC method, a microphone is disposed in the vicinity of a noise source to collect noises from the noise source. From the noises, a noise that is the noise which is desirably cancelled at a given area is predicted using an adaptive filter such as an infinite impulse responsive (IIR) or a finite impulse responsive (FIR) filter. In that area, a sound that is opposite in phase to the predicted noise is emitted from a speaker to cancel the same and thereby to cause it to cease to exist.

The ANC method, however, requires data in the past in the noise prediction and is found hard to meet with what is called a bust noise. Further, the use of an adaptive filter in the noise cancellation is found to cause the information on a phase difference between right and left channels to be distorted or even to vanish so that the direction from which a sound is emitted becomes unascertainable.

Furthermore, while the microphone used to collect noises from the noise source should desirably collect noises selectively as much as possible, it is difficult in the robot audition apparatus to collect noises nothing but noises.

Moreover, while the need to entail a time of computation for predicting what the noise is that should desirably be cancelled in a given area requires as a precondition that the speaker be disposed spaced apart from the noise source by more than a certain distance, the robot audition apparatus necessarily reduces the time of computation since an external microphone for collecting an external sound must be disposed adjacent to the inner microphone for collecting noises and makes it impractical to use the ANC method.

It can thus be seen that adopting the ANC method in order to cancel noises generated in the interior of a robot is unsuitable.

With the foregoing taken into account, it is an object of the present invention to provide a robot auditory apparatus and system that can effect active perception by collecting a sound from an outside target with no influence exerted by noises generated inside of the robot such as those emitted from the robot drive means.

DISCLOSURE OF THE INVENTION

The object mentioned above is attained in accordance with the present invention in a first aspect thereof by a robot auditory apparatus for a robot having a noise generating source in its interior, characterized in that it comprises: a sound insulating cladding with which at least a portion of the robot is covered; at least two outer microphones disposed outside of the said cladding for collecting an external sound primarily; at least one inner microphone disposed inside of the said cladding for primarily collecting noises from the said noise generating source in the robot interior; a processing section responsive to signals from the said outer and inner microphones for canceling from respective sound signals from the said outer microphones, noises signal from the said interior noise generating source; and a directional information extracting section responsive to the left and right sound signals from the said processing section for determining the direction from which the said external sound is emitted, wherein the said processing section is adapted to detect burst noises owing to the said noise generating source from a signal from the said at least one inner microphone for removing signal portions from the said sound signals for bands containing the burst noises.

In the robot auditory apparatus of the present invention, the sound insulating cladding is preferably made up for self-recognition by the robot, In the robot auditory apparatus of the present invention, the said processing section is preferably adapted to regard noises as the burst noises and remove signal portions for the bands containing those noises upon finding that a difference in intensity between the sound signals of the said inner and outer microphones for the noises is close to an intensity in difference between those for template noises by robot drive means, that the spectral intensity and pattern of input sounds to the said inner and outer microphone for the noises are close to those in a frequency response for the template noises by the robot drive means and further that the drive means is in operation.

In the robot auditory apparatus of the present invention, the said directional information extracting section is preferably adapted to make a robust determination of the sound direction (sound source localization) by processing directional information of the sound in accordance with an auditory epipolar geometry based method and, if the sound has a harmonic structure, upon isolating the sound from another sound with the use of such a harmonic structure and by using information as to a difference in intensity between sound signals.

To achieve the object mentioned above, the present invention also provides in a second aspect thereof a robot auditory system for a robot having a noise generating source in its interior, characterized in that it comprises: a sound insulating cladding, preferably for self-recognition by the robot, with which at least a portion of the robot is covered; at least two outer microphones disposed outside of the said cladding for collecting external sounds primarily; at least one inner microphone disposed inside of the said cladding for primarily collecting noises from the said noise generating source in the robot interior; a processing section responsive to signals from the said outer and inner microphones for canceling from respective sound signals from the said outer microphones, noise signals from the said interior noise generating source; a pitch extracting section for effecting a frequency analysis on each of the left and right sound signals from the said processing section to provide sound data as to time, frequency and power thereof from a pitch accompanied harmonic structure which the sound data signifies; a left and right channel corresponding section responsive to left and right sound data from the said pitch extracting section for providing respective sets of directional information determining the directions from which the sounds are emitted, respectively; and a sound source separating section for splitting said sound data into those sound data for respective sound sources of said sounds on the basis of such harmonic structures identified by the said pitch extracting section of the said sound signals or the said sets of directional information provided by said left and right channel corresponding section, wherein the said processing section is adapted to detect burst noises owing to the said noise generating source from a signal from the said at least one inner microphone for removing signal portions from the said sound signals for bands containing the burst noises.

To achieve the object mentioned above, the present invention also provides in a third aspect thereof a robot auditory system for a humanoid or animaloid robot having a noise generating source in its interior, characterized in that it comprises: a sound insulating cladding, preferably for self-recognition by the robot, with which at least a head portion of the robot is covered; at least a pair of outer microphones disposed outside of the said cladding and positioned thereon at a pair of ear corresponding areas, respectively, of the robot for collecting external sounds primarily; at least one inner microphone disposed inside of the said cladding for primarily collecting noises from the said noise generating source in the robot interior; a processing section responsive to signals from the said outer and inner microphones for canceling from respective sound signals from the said outer microphones, noise signals from the said interior noise generating source; a pitch extracting section for effecting a frequency analysis on each of the left and right sound signals from the said processing section to provide sound data as to time, frequency and power thereof from a pitch accompanied harmonic structure which the sound data signifies; a left and right channel corresponding section responsive to left and right sound data from the said pitch extracting section for providing respective sets of directional information determining the directions from which the sounds are emitted, respectively; and a sound source separating section for splitting the said sound data into those sound data for respective sound sources of said sounds on the basis of such harmonic structures or the said sets of directional information provided by the said left and right channel corresponding section, wherein the said processing section is adapted to detect burst noises owing to the said noise generating source from a signal from the said at least one inner microphone for removing signal portions from the said sound signals for bands containing the said burst noises.

For the robot auditory system of the present invention, the robot is preferably provided with one or more of other perceptual systems including vision and tactile systems furnishing a vision or tactile image of a sound source, and the said left and right channel corresponding section is adapted to refer to image information from such system or systems as well to control signals for a drive means for moving the robot and thereby to determine the direction of the sound source in coordinating the auditory information with the image and movement information.

In the robot auditory system of the present invention, the said left and right channel corresponding section preferably is also adapted to furnish the said other perceptual system or systems with the auditory directional information.

In the robot auditory system of the present invention, the said processing section preferably is adapted to regard noises as the burst noises and remove signal portions for the bands containing those noises upon finding that a difference in intensity between the sound signals of the said inner and outer microphones for the said noises is close to an intensity in difference between those for template noises by robot drive means, that the spectral intensity and pattern of input sounds to the said inner and outer microphone for the said noises are dose to those in a frequency response for the template noises by the robot drive means and further that the drive means is in operation.

In the robot auditory system of the present invention, the said processing section preferably is adapted to remove such signal portions as burst noises if a sound signal from the said at least one inner microphone is enough larger in power than a corresponding sound signal from the said outer microphones and further if peaks exceeding a predetermined level are detected over the said bands in excess of a preselected level.

In the robot auditory system of the present invention, the said processing section preferably is adapted to regard noises as the burst noises and remove signal portions for the bands containing those noises upon finding that the pattern of spectral power differences between the sound signals from the said outer and inner microphones is substantially equal to a pattern of those measured in advance for noises by robot drive means, that the spectral sound pressures and their pattern are substantially equal to those in a frequency response measured in advance for noises by the drive means and further that a control signal for the drive means indicates that the drive means is in operation.

In the robot auditory apparatus of the present invention, preferably the said left and right channel corresponding section is adapted to make a robust determination of the sound direction (sound source localization) by processing directional information of the sound in accordance with an auditory epipolar geometry based method and, if the sound has a harmonic structure, upon isolating the sound from another sound with the use of such a harmonic structure and by using information as to a difference in intensity between sound signals.

In the operation of a robot auditory apparatus or system constructed as mentioned above, the outer microphones collect mostly a sound from an external target while the inner microphone collects mostly noises from a noise generating source such as drive means within the robot. Then, while the outer microphones also collect noise signals from the noise generating source within the robot, the noise signals so mixed in are processed in the processing section and cancelled by noise signals collected by the inner microphone and thereby markedly diminished. Then, in the processing section, burst noises owing to the internal noise generating source are detected from the signal from the inner microphone and signal portions in the signals from the outer microphones for those bands which contain the burst noises are removed. To wit, those signals from the outer microphones which contain the burst noises are wholly removed in the processing section. This permits the direction from which the sound is emitted to be determined with greater accuracy in the directional information extracting section or the left and right channel corresponding section practically with no influence received from the burst noises.

And, there follow the frequency analyses in the pitch extracting section on the sound signals from which the noises have been cancelled to yield those sound signals which permit the left and right channel corresponding section to give rise to sound data determining the directions of the sounds, which can then be split in the sound source separating section into those sound data for the respective sound sources of the sounds.

Therefore, given the fact that the sound signals from the outer microphones have a marked improvement in their S/N ratio achieved not only with noises from the noise generating source such as drive means within the robot sharply diminished easily but also with their signal portions removed for the bands containing burst noises, it should be apparent that sound data isolation for each individual sound source is here achieved all the more advantageously and accurately.

Further, if the robot is provided with one or more of other perceptual systems including vision and tactile systems and the left and right channel corresponding section in determining a sound direction is adapted to refer to information furnished from such system or systems, the left and right channel corresponding section then is allowed to make a still more clear and accurate sound direction determination with reference, e.g., to vision information about the target furnished from the vision apparatus.

Adapting the left and right channel corresponding section to furnish the other perceptual system or systems with the auditory directional information allows, e.g., the vision apparatus to be furnished with the auditory directional information about the target and hence the vision apparatus to make a still more definite sound direction determination.

Adapting the processing section to regard noises as the burst noises and remove signal portions for the bands containing those noises upon finding that a difference in intensity between the sound signals of the inner and outer microphones for the noises is close to an intensity in difference between those for template noises by robot drive means, that the spectral intensity and pattern of input sounds to the inner and outer microphone for the noises are close to those in a frequency response for the template noises by the robot drive means and further that the drive means is in operation, or adapting the processing section to remove such signal portions as burst noises if a sound signal from the at least one inner microphone is enough larger in power than a corresponding sound signal from the outer microphones and further if peaks exceeding a predetermined level are detected over several such sub-bands of a preselected frequency width, facilitates removal of the burst noises.

Adapting the processing section to regard noises as the burst noises and remove signal portions for the bands containing those noises upon finding that the pattern of spectral power differences between the sound signals from the outer and inner microphones is substantially equal to a pattern of those measured in advance for noises by robot drive means, that the spectral sound pressures and their pattern are substantially equal to those in a frequency response measured in advance for noises by the drive means and further that a control signal for the drive means indicates that the drive means is in operation, allows the burst noises to be removed with greater accuracy.

Adapting the left and right channel corresponding section to make a robust determination of the sound direction (sound source localization) by processing directional information of the sound in accordance with an auditory epipolar geometry based method and, if the sound has a harmonic structure, upon isolating the sound from another sound with the use of such a harmonic structure and by using information as to a difference in intensity between sound signals, allows methods of computation of the epipolar geometry performed in the conventional vision system to be applied to the auditory system, thereby permitting a determination of the sound direction to be made with no influence received from the robot's cladding and acoustic environment and hence all the more accurately.

It should be noted at this point that the present invention eliminates the need to use a head related transfer function (HRTF) that has been common in the conventional binaural system. Avoiding the use of the HRTF which as known is weak in a change in the acoustic environment and must be recomputed and adjusted as it changes, a robot auditory apparatus/system according to the present invention is highly universal, entailing no such re-computation and adjustment.

BRIEF DESCRIPTION OF THE DRAWINGS

The present invention will better be understood from the following detailed description and the drawings attached hereto showing certain illustrative embodiments of the present invention. In this connection, it should be noted that such forms of embodiment illustrated in the accompanying drawings hereof are intended in no way to limit the present invention but to facilitate an explanation and understanding thereof. In the drawings.

BEST MODES FOR CARRYING OUT THE INVENTION

Figure 1:
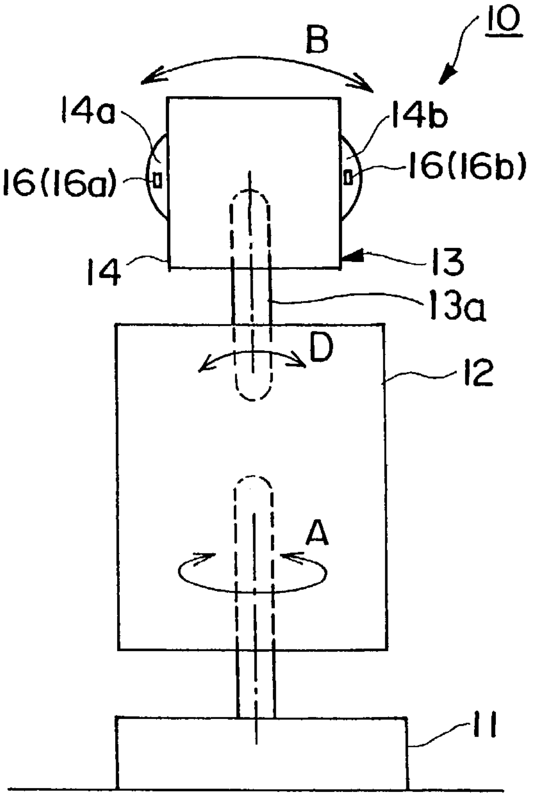
FIG. 1 is a front elevational view illustrating the appearance of a humanoid robot incorporating a robot auditory apparatus that represents one form of embodiment of the present invention.

Hereinafter, certain forms of embodiment of the present invention as regards a robot auditory apparatus and system will be described in detail with reference to the drawing figures.

Figure 2:
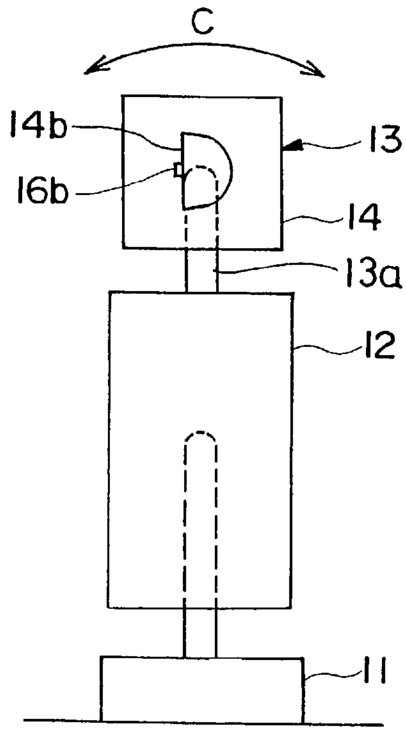
FIG. 2 is a side elevational view of the humanoid robot shown in FIG. 1.

FIGS. 1 and 2 in combination show an overall makeup of an experimental human-type robot or humanoid incorporating a robot auditory system according to the present invention in one form of embodiment thereof.

In FIG. 1, the humanoid indicated by reference character 10 is shown made up as a robot with four degrees of freedom (4DOFs) and including a base 11, a body portion 12 supported on the base 11 so as to be rotatable uniaxially about a vertical axis, and a head portion 13 supported on the body portion 12 so as to be capable of swinging triaxially about a vertical axis, a lateral horizontal axis extending from right to left or vice versa and a longitudinal horizontal axis extending from front to rear or vice versa.

The base 11 may either be disposed in position or arranged operable as a foot of the robot. Alternatively, the base 11 may be mounted on a movable carriage or the like.

The body portion 12 is supported rotatably relative to the base 11 so as to turn about the vertical axis as indicated by the arrow A in FIG. 1. It is rotationally driven by a drive means not shown and is covered with a sound insulating cladding as illustrated.

The head portion 13 is supported from the body portion 12 by means of a connecting member 13*a* and is made capable of swinging relative to the connecting member 13*a*, about the longitudinal horizontal axis as indicated by the arrow B in FIG. 1 and also about the lateral horizontal axis as indicated by the arrow C in FIG. 2. And, as carried by the connecting member 13*a*, it is further made capable of swinging relative to the body portion 12 as indicated by the arrow D in FIG. 1 about another longitudinal horizontal axis extending from front to rear or vice versa. Each of these rotational swinging motions A, B, C and D for the head portion 13 is effected using a respective drive mechanism not shown.

Figure 3:
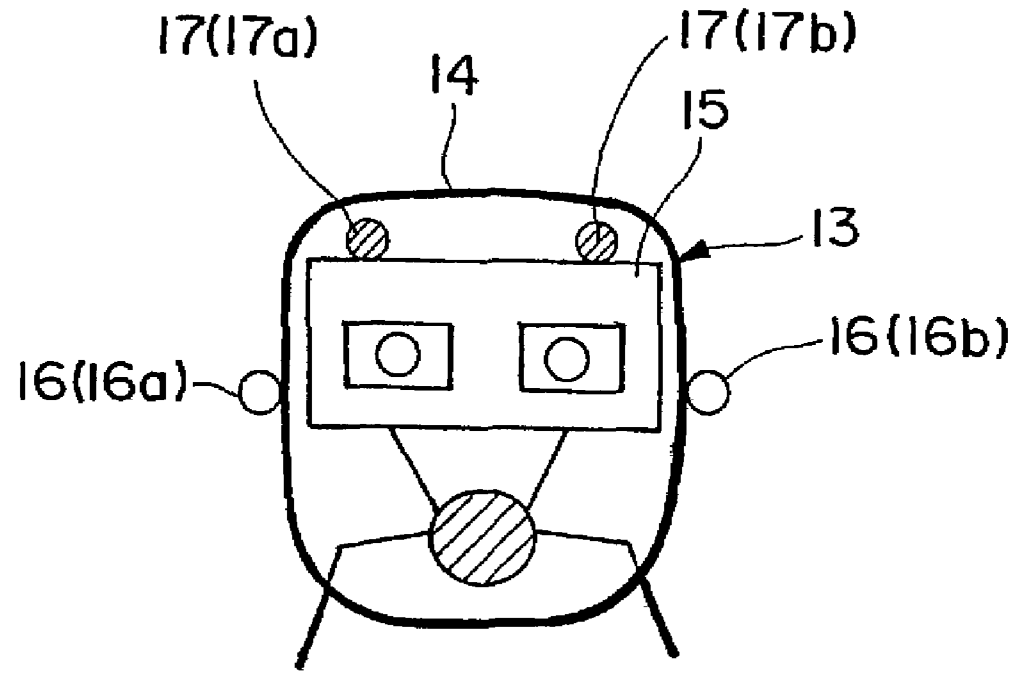
FIG. 3 is an enlarged view diagrammatically illustrating a makeup of the head portion of the humanoid robot shown in FIG. 1.

Here, the head portion 13 as shown in FIG. 3 is covered over its entire surface with a sound insulating cladding 14 and at the same time is provided at its front side with a camera 15 as the vision means in charge of robot's vision and at its both sides with a pair of outer microphones 16 (16*a* and 16*b*) as the auditory means in charge of robot's audition or hearing.

Further, also as shown in FIG. 3 the head portion 13 includes a pair of inner microphones 17 (17*a* and 17*b*) disposed inside of the cladding 14 and spaced apart from each other at a right and a left hand side.

The cladding 14 is composed of a sound absorbing synthetic resin such as, for example, urethane resin and by covering the inside of the head portion 13 virtually to the full is designed to insulate and shield sounds within the head portion 13. It should be noted that the cladding with which the body portion 12 likewise is covered may similarly be composed of such a sound absorbing synthetic resin. It should further be noted that the cladding 14 is provided to enable the robot to recognize itself or to self-recognize, and namely to play a role of partitioning sounds emitted from its inside and outside for its self-recognition. Here, by the term “self-recognition” is meant distinguishing an external sound emitted from the outside of the robot from internal sounds such as noises emitted from robot drive means and a voice uttered from the mouth of the robot. Therefore, in the present invention the cladding 14 is to seal the robot interior so tightly that a sharp distinction can be made between internal and external sounds for the robot.

The camera 15 may be of a known design, and thus any commercially available camera having three DOFs (degrees of freedom): panning, tilting and zooming functions is applicable here.

The outer microphones 16 are attached to the head portion 13 so that in its side faces they have their directivity oriented towards its front.

Here, the right and left hand side microphones 16*a* and 16*b* as the outer microphones 16 as will be apparent from FIGS. 1 and 2 are mounted inside of, and thereby received in, stepped bulge protuberances 14*a* and 14*b*, respectively, of the cladding 14 with their stepped faces having one or more openings and facing to the front at the both sides and are thus arranged to collect through these openings a sound arriving from the front. And, at the same time they are suitably insulated from sounds interior of the cladding 14 so as not to pick up such sounds to an extent possible. This makes up the outer microphones 16*a* and 16*b* as what is called a binaural microphone. It should be noted further that the stepped bulge protuberances 14*a* and 14*b* in the areas where the outer microphones 16*a* and 16*b* are mounted may be shaped so as to resemble human outer ears or each in the form of a bowl.

The inner microphones 17 in a pair are located interior of the cladding 14 and, in the form of embodiment illustrated, positioned to lie in the neighborhoods of the outer microphones 16*a* and 16*b*, respectively, and above the opposed ends of the camera 15, respectively, although they may be positioned to lie at any other appropriate sites interior of the cladding 14.

Figure 4:
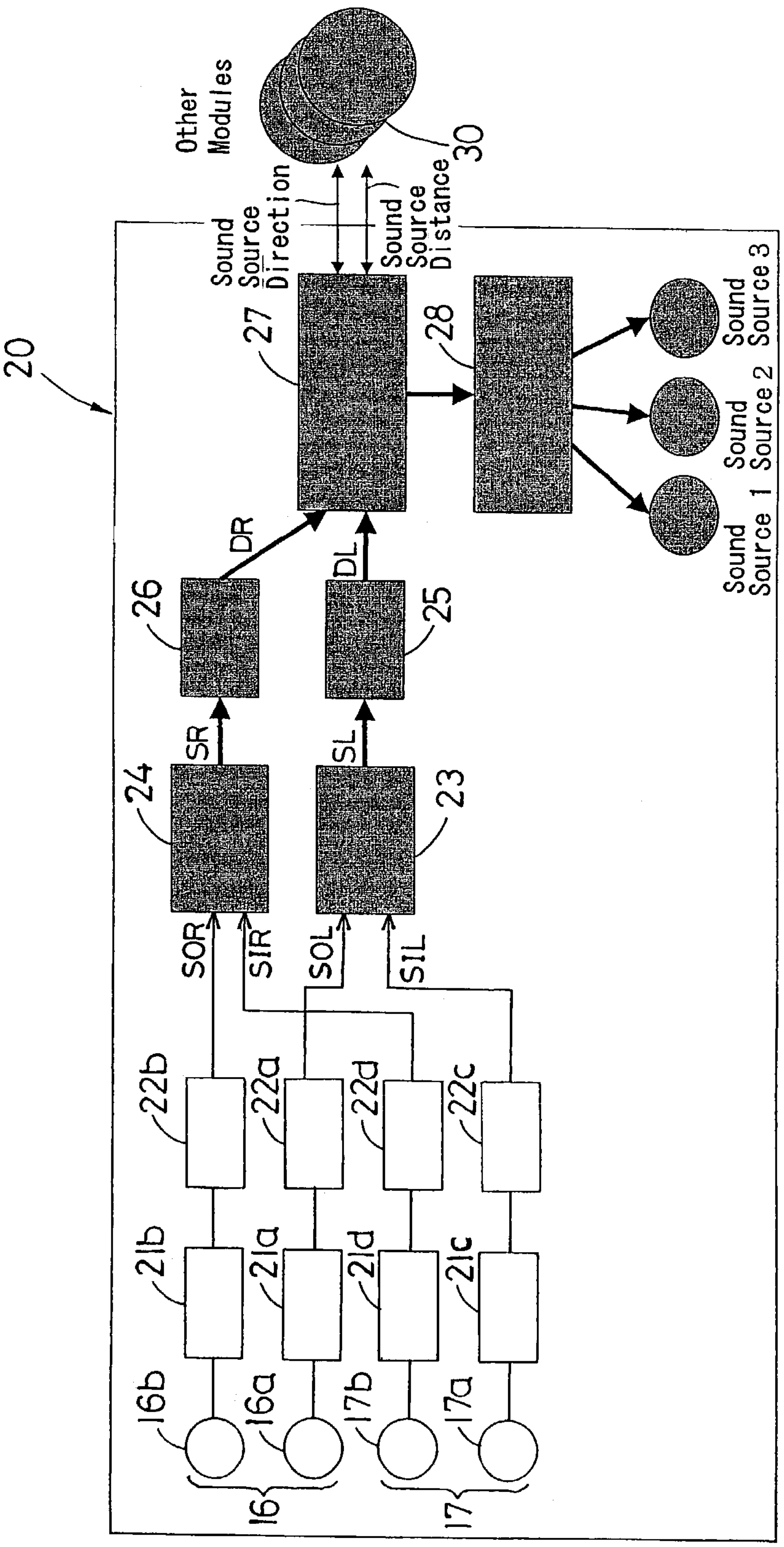
FIG. 4 is a block diagram illustrating the electrical makeup of a robot auditory system for the humanoid robot shown in FIG. 1.

FIG. 4 shows the electrical makeup of an auditory system including the outer microphone means 16 and the inner microphone means 17 for sound processing. Referring to FIG. 4, the auditory system indicated by reference character 20 includes amplifiers 21*a*, 21*b*, 21*c* and 21*d* for amplifying sound signals from the outer and inner microphones 16*a*, 16*b*, 17*a* and 17*b*, respectively; AD converters 22*a*, 22*b*, 22*c* and 22*d* for converting analog signals from these amplifiers into digital sound signals SOL, SOR, SIL and SIR; a left and a right hand side noise canceling circuit 23 and 24 for receiving and processing these digital sound signals; pitch extracting sections 25 and 26 into which digital sound signals SR and SL from the noise canceling circuits 23 and 24 are entered; a left and right channel corresponding section 27 into which sound data from the pitch extracting sections 25 and 26 are entered; and a sound source separating section 28 into which data from the left and right channel corresponding section 27 are introduced.

The AD converters 22*a* to 22*d* are each designed, e.g., to issue a signal upon sampling at 48 kHz for quantized 16 or 24 bits.

And, the digital sound signal SOL from the left hand side outer microphone 16*a* and the digital sound signal SIL from the left hand side inner microphone 17*a* are furnished into the first noise canceling circuit 23, and the digital sound signal SOR from the right hand side outer microphone 16*b* and the digital sound signal SIR from the left hand side inner microphone 17*b* are furnished into the second noise canceling circuit 24. These noise canceling circuits 23 and 24 are identical in makeup to each other and are each designed to bring about noise cancellation for the sound signal from the outer microphone 16, using a noise signal from the inner microphone 17. To wit, the first noise canceling circuit 23 processes the digital sound signal SOL from the outer microphone 16*a* by noise canceling the same on the basis of the noise signal SIL emitted from noise sources within the robot and collected by the inner microphone 17*a*, most conveniently by a suitable processing operation such as by subtracting from the digital sound signal SOL from the outer microphone 16*a*, the sound signal SIL from the inner microphone 17*a*, thereby removing noises originating in the noise sources such as various driving elements (drive means) within the robot and mixed into the sound signal SOL from the outer microphone 16*a* and in turn generating the left hand side noise-free sound signal SL. Likewise, the second noise canceling circuit 24 processes the digital sound signal SOR from the outer microphone 16*b* by noise canceling the same on the basis of the noise signal SIR emitted from noise sources within the robot and collected by the inner microphone 17*b*, most conveniently by a suitable processing operation such as by subtracting from the digital sound signal SOR from the outer microphone 16*b*, the sound signal SIR from the inner microphone 17*b*, thereby removing noises originating in the noise sources such as various driving elements (drive means) within the robot and mixed into the sound signal SOR from the outer microphone 16*b* and in turn generating the right hand side noise-free sound signal SR.

The noise canceling circuit 23, 24 here is designed further to detect what is called a burst noise in the sound signal SIL, SIR from the inner microphone 17*a*, 17*b* and to cancel from the sound signal SOL, SOR from the outer microphone 16*a*, 16*b*, that portions of the signal which may correspond to the band of the burst noise, thereby raising the accuracy at which is determinable the direction in which the source of a sound of interest mixed with the burst noise lies. The burst noise cancellation may be performed within the noise canceling circuit 23, 24 in one of two ways as mentioned below.

In a first burst noise canceling method, the sound signal SIL, SIR from the inner microphone 17*a*, 17*b* is compared with the sound signal SOL, SOR from the outer microphone 16*a*, 16*b*. If the sound signal SIL, SIR is enough greater in power than the sound signal SOL, SOR and a certain number (e.g., 20) of those peaks in power of SIL, SIR which exceed a given value (e.g., 30 dB) succeeds over sub-bands of a given frequency width, e.g., 47 Hz, and further if the drive means continues to be driven, then the judgment may be made that there is a burst noise. Here, so that a signal portion corresponding to that sub-band may be removed from the sound signal SOL, SOR, the noise canceling circuit 23, 24 must then have been furnished with a control signal for the drive means.

In the detection and judgment of the presence of such a burst noise and its removal, it may be noted at this point that a second burst noise canceling method to be described later herein is preferably used.

Such a burst noise is removed using, e.g., an adaptive filter, which is a linear phase filter and is made up of FIR filters in the order of, say, 100, wherein parameters of each FIR filter are computed using the least squares method as an adaptive algorithm.

Figure 6:
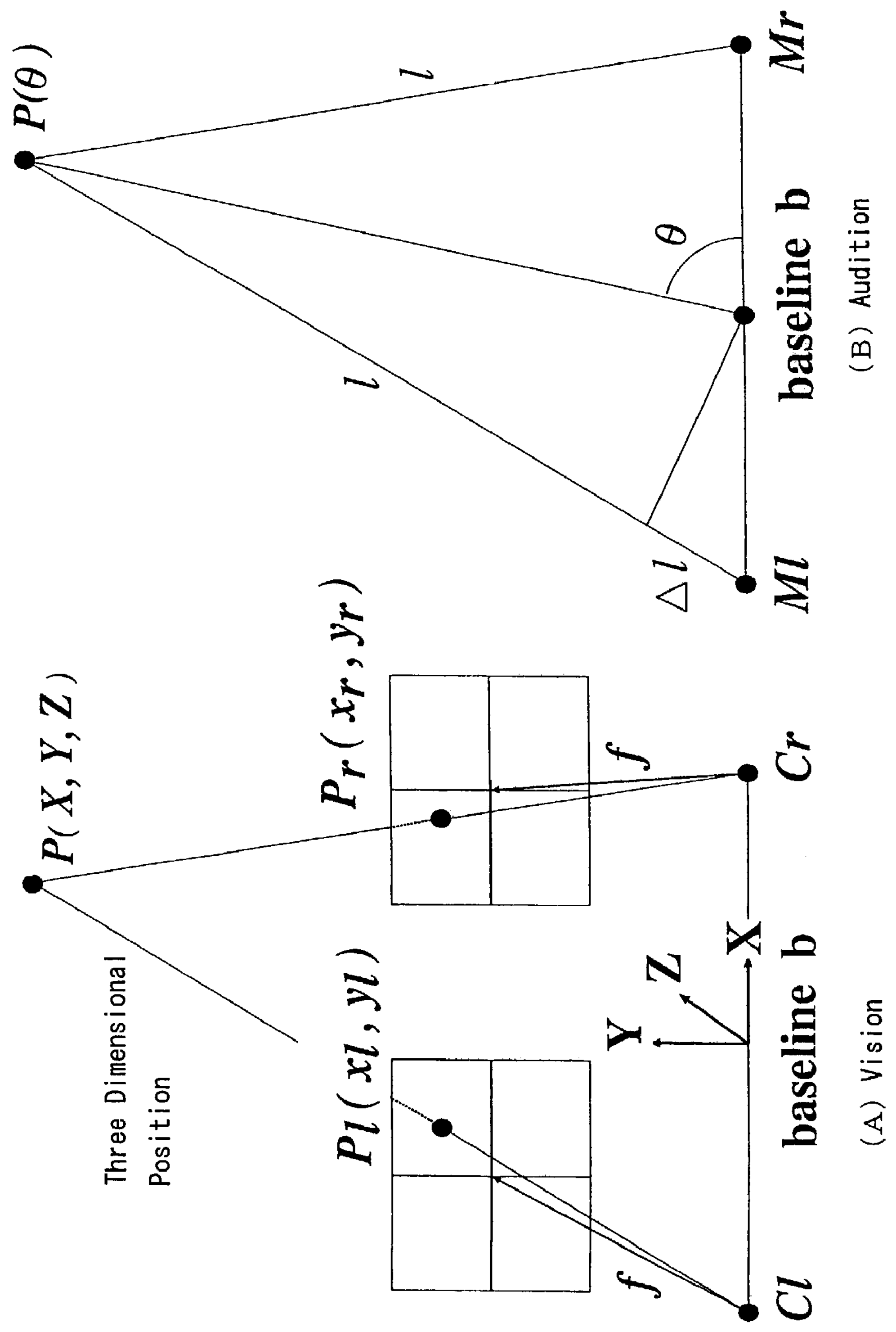
FIGS. 6A and 6B are diagrammatic views illustrating orientations by epipolar geometry in vision and audition, respectively.

Thus, the noise canceling circuits 23 and 24 as shown in FIG. 6, each by functioning as a burst noise suppressor, act to detect and remove a burst noise.

The pitch extracting sections 25 and 26, which are identical in makeup to each other, are each designed to perform the frequency analysis on the sound signal SL (left), SR (right) and then to take out a triaxial acoustic data composed of time, frequency and power. To wit, the pitch extracting section 25 upon performing the frequency analysis on the left hand side sound signal SL from the noise canceling circuit 23 takes out a left hand side triaxial acoustic data DL composed of time, frequency and power or what is called a spectrogram from the biaxial sound signal SL composed of time and power. Likewise, the pitch extracting section 26 upon performing the frequency analysis on the right hand side sound signal SR from the noise canceling circuit 24 takes out a right hand side triaxial acoustic data (spectrogram) DR composed of time, frequency and power or what is called a spectrogram from the biaxial sound signal SR composed of time and power.

Here, the frequency analysis mention above may be performed by way of FFT (fast Fourier transformation), e.g., with a window length of 20 milliseconds and a window spacing of 7.5 milliseconds, although it may be performed using any of other various common methods.

With such an acoustic data DL as is obtainable in this manner, each sound in a speech or music can be expressed in a series of peaks on the spectrogram and is found to possess a harmonic structure in which peaks regularly appear at frequency values which are integral multiples of some fundamental frequency.

Peak extraction may be carried out as follows. A spectrum of a sound is computed by Fourier-transforming it for, e.g., 1024 sub-bands at a sampling rate of, e.g., 48 kHz. This is followed by extracting local peaks which is higher in power than a threshold. The threshold, which varies for frequencies, is automatically found on measuring background noises in a room for a fixed period of time. In this case, for reducing the amount of computations use may be made of a band-pass filter to strike off both a low frequency range of frequencies not more than 90 Hz and a high frequency range of frequencies not less than 3 kHz. This provides the peak extraction with enough fastness.

The left and right channel corresponding section 27 is designed to effect determination of the direction of a sound by assigning to a left and a right hand channel, pitches derived from the same sound and found in the harmonic structure from the peaks in the acoustic data DL and DR from the left and right hand pitch extracting sections 25 and 26, on the basis of their phase and time differences. This sound direction determination (sound source localization) is made by computing sound direction data in accordance with an epipolar geometry based method. As for a sound having a harmonic structure, a robust sound source localization is achieved using both the sound source separation that utilizes the harmonic structure and the intensity difference data of the sound signals.

Here, in the epipolar geometry by vision, with a stereo-camera comprising a pair of cameras having their optical axes parallel to each other, their image planes on a common plane and their focal distances equal to each other, if a point P (X, Y, Z) is projected on the cameras' respective image planes at a point P1 (xl, yl) and P2 (xr, yr) as shown in FIG. 6A, then the following relational expressions stand valid $$X = \frac{b(xl + xr)}{2d},\ Y = \frac{b(yl + yr)}{2d},\ Z = \frac{bf}{d}$$

where f, b and d are defined by the focal distance of each camera, baseline and (xl−xr), respectively.

If this concept of epipolar geometry is introduced into the audition under consideration, it is seen that the following equation is valid for the angle θ defining the direction from the center between the outer microphones 16*a* and 16*b* towards the sound source P as shown in FIG. 6B:

$$\cos\theta = \frac{v}{2\pi fb}\Delta\phi$$

where v and f are the sound velocity and frequency, respectively.

Since there is a difference in distance Δl to the sound source from the left and right hand side outer microphones 16*a* and 16*b*, it is further seen that there occurs a phase difference IPD=Δϕ between the left and right hand side sound signals SOL and SOR from these outer microphones.

The sound direction determination is effected by extracting peaks on performing the FFT (Fast Fourier Transformation) about the sounds so that each of the sub-bands has a band width of, e.g., 47 Hz to compute the phase difference IPD. Further, the same can be computed much faster and more accurately than by the use of HRTF if in extracting the peaks computations are made with the Fourier transformations for, e.g., 1024 sub-bands at a sampling rate of 48 kHz.

This permits the sound direction determination (sound source localization) to be realized and attained without resort to the HRTF (head related transfer function). In the peak extraction, use is made of a method by spectral subtraction using the FFT for, e.g., 1024 points at a sampling rate of 48 kHz. This permits the real-time processing to be effected accurately. Moreover, the spectral subtraction entails the spectral interpolation with the properties of a window function of the FFT taken into account.

Figure 5:
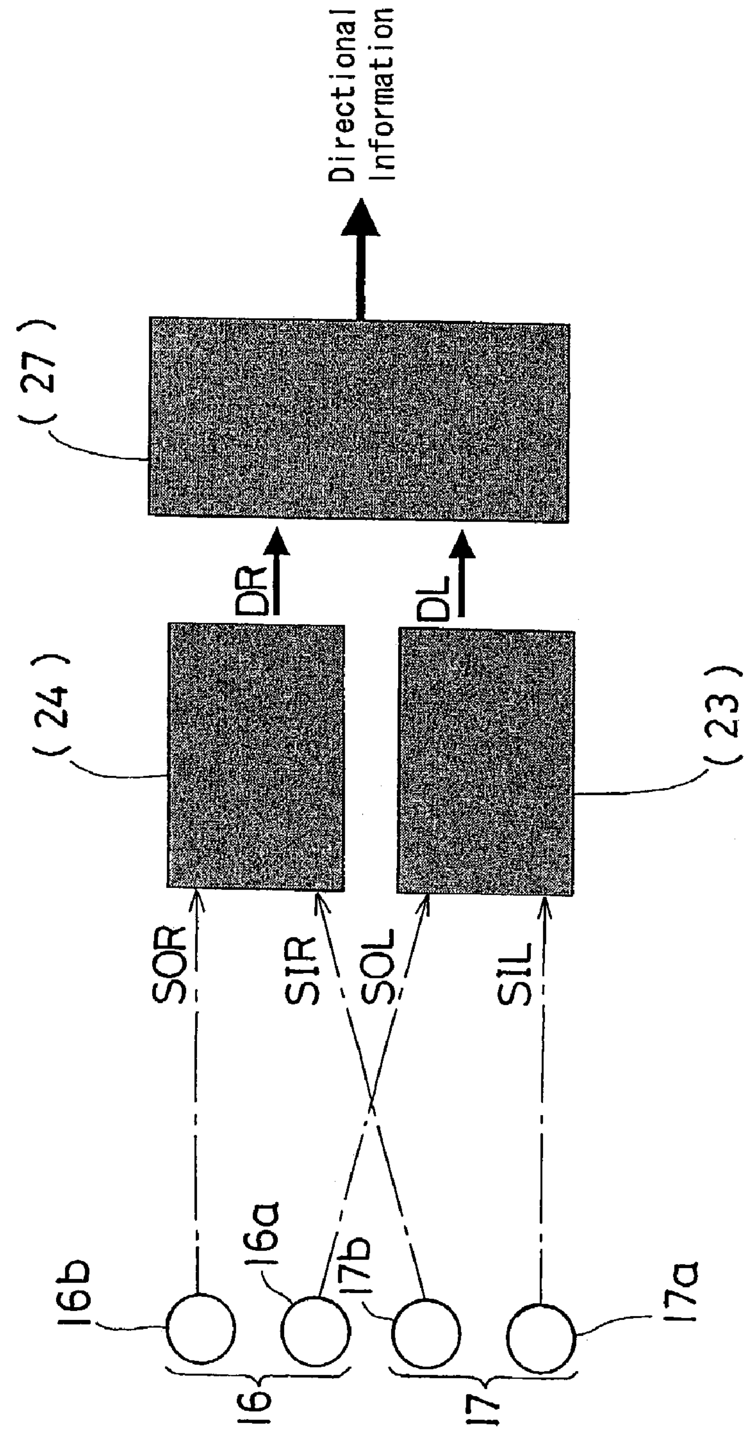
FIG. 5 is a block diagram illustrating an essential part of the robot auditory system shown in FIG. 4.

Thus, the left and right channel corresponding section 27 as shown in FIG. 5 acts as a directional information extracting section to extract a directional data. As illustrated, the left and right channel corresponding section 27 is permitted to make an accurate determination as to the direction of a sound from a target by being supplied with data or pieces of information about the target from separate systems of perception 30 provided for the robot 10 but not shown, other than the auditory system, more specifically, for example, data or pieces of information supplied from a vision system as to the position, direction, shape of the target and whether it is moving or not and those supplied from a tactile system as to how the target is soft or hard, if it is vibrating, how its touch is, and so on. For example, the left and right hand channel corresponding section 27 compares the above mentioned directional information by audition with the directional information by vision from the camera 15 to check their matching and correlate them.

Furthermore, the left and right channel corresponding section 27 may be made responsive to control signals applied to one or more drive means in the humanoid robot 10 and, given the directional information about the head 13 (the robot's coordinates), thereby able to compute a relative position to the target. This enables the direction of the sound from the target to be determined even more accurately even it the humanoid robot 10 is moving.

The sound source separating section 28, which can be made up in a known manner, makes use of a direction pass filter to localization each of different sound sources on the basis of the direction determining information and the sound data DL and DR all received from the left and right channel corresponding section 27 and also to separate the sound data for the sound sources from one source to another.

This direction pass filter operates to collect sub-bands, for example, as follows: A particular direction θ is converted to Δϕ for each sub-band (47 Hz), and then peaks are extracted to compute a phase difference (IPD) and Δϕ'. And, if the phase difference, Δϕ'=Δϕ, the sub-band is collected. The same is repeated for all the sub-bands to make up a waveform formed of the collected sub-bands.

Here, setting that the spectra of the left and right channels obtained by the concurrent FFT are $Sp^{(l)}$ and $Sp^{(r)}$, these spectral at the peak frequency fp, $Sp^{(l)}$(fp) and $Sp^{(r)}$(fp) can be expressed in their respective real and imaginary parts: R[$Sp^{(r)}$(fp)], and R[$Sp^{(l)}$(fp)]; and I[$Sp^{(r)}$(fp)] and I[$Sp^{(l)}$(fp)].

Therefore, Δϕ above can be found from the equation;

$$\Delta\phi = \tan^{-1}\left(\frac{I[Sp^{(r)}(f_p)]}{R[Sp^{(r)}(f_p)]}\right) - \tan^{-1}\left(\frac{I[Sp^{(l)}(f_p)]}{R[Sp^{(l)}(f_p)]}\right)$$

Since the conversion can thus be readily done from the epipolar plane by vision (camera 15) to the epipolar plane by audition (outer microphones 16) as shown in FIG. 6, the target direction (θ) can be readily determined on the basis of epipolar geometry by audition and from the equation (2) mentioned before by setting there f=fp.

Figure 7:
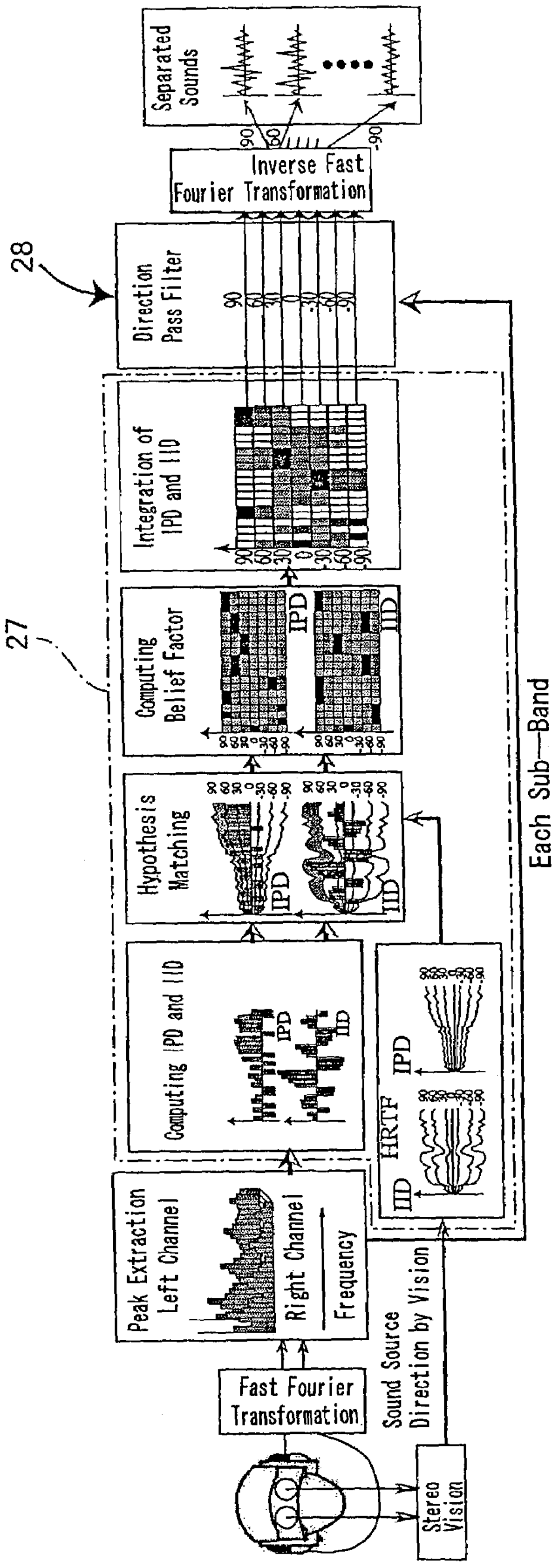
FIGS. 7 and 8 are conceptual views illustrating procedures involved in processes of localizing and separating sources of sounds.

In this manner, sound sources are oriented at the left and right channel corresponding section 27 and thereafter separated or isolated from one another at the sound source separating section 28. FIG. 7 illustrates these processing operations in a conceptual view.

Also, regarding the sound direction determination and sound source localization, it should be noted that a robust sound source localization can be attained using a method of realizing the sound source separation by extracting a harmonic structure. To wit, this can be achieved by replacing, among the modules shown in FIG. 4, the left and right channel corresponding section 27 and the sound source separating section 28 with each other so that the former may be furnished with data from the latter.

Figure 8:
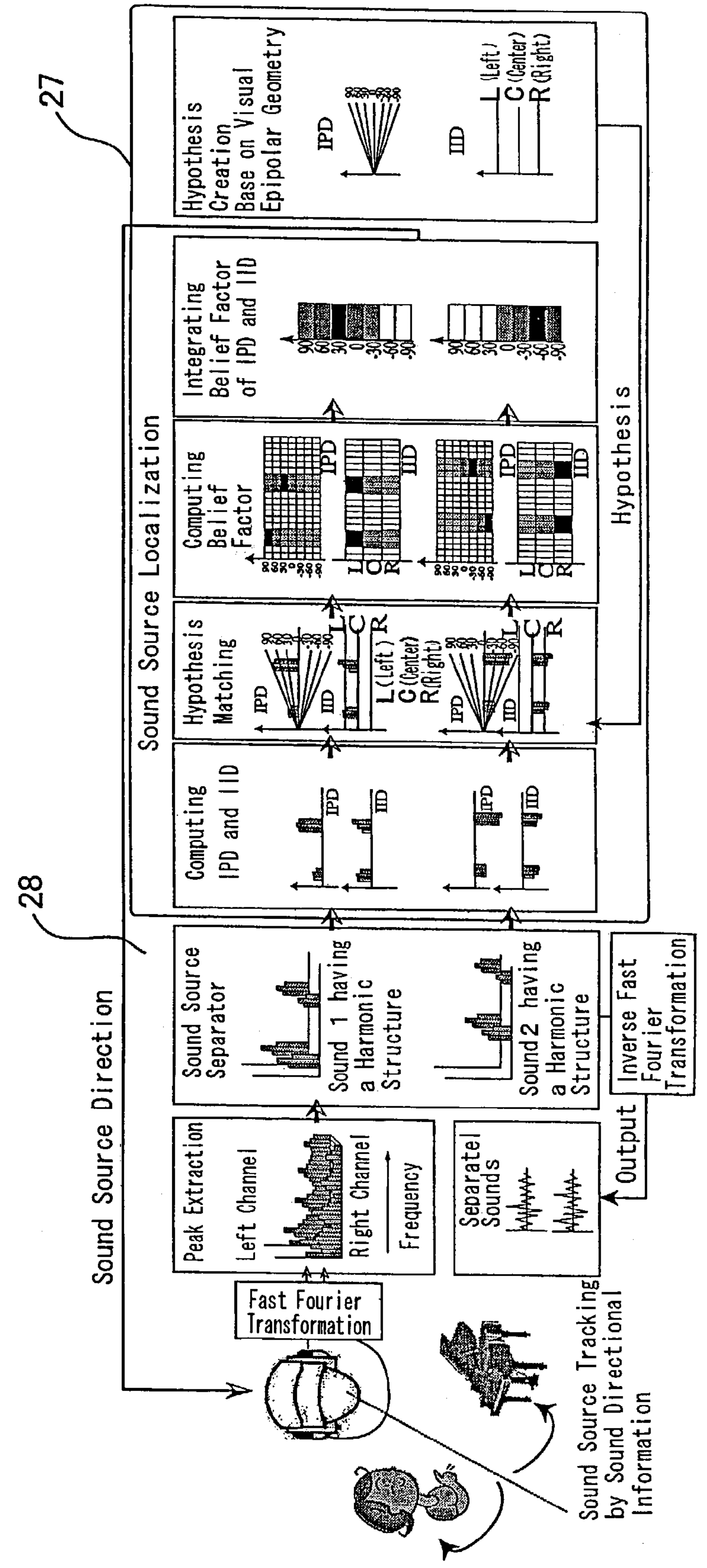

Mention is here made of sound source separation and orientation for sounds each having a harmonic structure. With reference to FIG. 8, first in the sound source separation, peaks extracted by peak extraction are taken out by turns from one with the lowest frequency. Local peaks with this frequency F0 and the frequencies Fn that can be counted as its integral multiples or harmonics within a fixed error (e.g., 6% that is derived from psychological tests) are clustered. And, an ultimate set of peaks assembled by such clustering is regarded as a single sound, thereby enabling the same to be isolated from another.

Mention is next made of the sound source localization. For sound source localization in Interaural hearing, use is made in general of the Interaural phase difference (IPD) and the Interaural intensity difference (IID) which are found from the head transfer function (HRTF). However, the HRTF, which largely depends on not only the shape of the head but also its environment, thus requiring re-measurement each time the environment is altered, is unsuitable for real-world applications.

Accordingly, use is made herein of a method based on the auditory epipolar geometry that represents an extension of the concept of epipolar geometry in vision to audition in the sound source localization using the IPD without resort to the HRTF.

In this case, (1) good use of the harmonic structure, (2) using the Dempster-Shafer theory, the integration of results of orientation by the auditory epipolar geometry using the IPD and those using the IID, and (3) the introduction of an active audition that permits an accurate sound source localization even while the motor is in operation, are seen to enhance the robustness of the sound orientation.

As illustrated in FIG. 8, this sound source localization is performed for each sound having a harmonic structure isolated by the sound separation from another. In the robot, sound source localization is effective to make by the IPD and IID for respective ranges of frequencies not more and not less than 1.5 kHz, respectively. For this reason, an input sound is split into harmonic components of frequencies not less than 1.5 KHz and those not more than 1.5 kHz for processing. First, auditory epipolar geometry used for each of harmonic components of frequencies $f_k$ not more than 1.5 kHz to make IPD hypotheses: $P_h(\theta, f_k)$ at intervals of 5° in a rage of ±90° for the robot's front.

Next, the distance function given below is used to compute the IPD: $P_s(f_k)$ for each of harmonics of the input sound and the distance: $d(\theta)$ between adjacent hypotheses. Here, the term $n_f$<1.5 kHz represents the harmonics of frequencies less than 1.5 kHz.

$$d(\theta) = \frac{1}{n_{f<1.5\text{KHz}}} \sum_{k=0}^{n_{f<1.5\text{KHz}}-1} \frac{(P_h(\theta, f_k) - P_s(f_k))^2}{f_k}$$

And then, the probability density function defined below is applied to the distance derived to convert the same to the Belief Factor $BF_{IPD}$ supporting the sound source direction where IPD is used. Here, m and s are the mean and variance of $d(\theta)$, respectively, and n is the number of distances d.

$$BF_{IPD}(\theta) = \int_{-\infty}^{\frac{d(\theta)-m}{\sqrt{\frac{s}{n}}}} \frac{1}{\sqrt{2\pi}} \exp\left(-\frac{x^2}{2}\right) dx$$

For the harmonics having the frequencies not less than 1.5 kHz in the input sound, the values given in Table 1 below according to plus and minus of the sum total of IIDs are used to indicate the Belief Factor $BF_{IID}$ supporting the sound source direction where the IID is used.

TABLE 1

Table indicating the Belief Factor ($BF_{IID}(\theta)$)

| θ | | 90° to 35° | 30 to −30° | −35° to 90° |
|---|---|---|---|---|
| Sum Total of | + | 0.35 | 0.5 | 0.65 |
| IIDs | − | 0.65 | 0.5 | 0.35 |

The two sets of values each supporting the sound source direction derived by processing IPD and IID are integrated by the equation given below according to the Dempster-Shafer theory to make a new firmness of belief supporting the sound source direction from both the IPD and IID.

$$BF_{IPD+IID}(\theta) = BF_{IPD}(\theta) BF_{IID}(\theta) + (1 - BF_{IPD}(\theta)) BF_{IID}(\theta) + BF_{IPD}(\theta)(1 - BF_{IID}(\theta))$$

Such Belief Factor $BF_{IPD+IID}$ is made for each of the angles to give values therefore, respectively, of which the largest is used to indicate an ultimate sound source direction.

With the humanoid robot 10 of the invention illustrated and so constructed as mentioned above, a target sound is collected by the outer microphones 16*a* and 16*b*, processed to cancel its noises and perceived to identify a sound source in a manner as mentioned below.

To wit, the outer microphones 16*a* and 16*b* collect sounds, mostly the external sound from the target to output analog sound signals, respectively. Here, while the outer microphones 16*a* and 16*b* also collect noises from the inside of the robot, their mixing is held to a comparatively low level by the cladding 14 itself sealing the inside of the head 13 therewith, from which the outer microphones 16*a* and 16*b* are also sound-insulated.

The inner microphones 17*a* and 17*b* collect sounds, mostly noises emitted from the inside of the robot, namely those from various noise generating sources therein such as working sounds from different moving driving elements and cooling fans as mentioned before. Here, while the inner microphones 17*a* and 17*b* also collect sounds from the outside of robot, their mixing is held to a comparatively low level because of the cladding 14 sealing the inside therewith.

The sound and noises so collected as analog sound signals by the outer and inner microphones 16*a* and 16*b*; and 17*a* and 17*b* are, after amplification by the amplifiers 21*a* to 21*d*, converted by the AD converter 22*a* to 22*d* into digital sound signals SOL and SOR; and SIL and SIR, which are then fed to the noise canceling circuits 23 and 24.

The noise canceling circuits 23 and 24, e.g., by subtracting sound signals SIL and SIR that originate at the inner microphones 17*a* and 17*b* from the sound signals SOL and SOR that originate at the outer microphone 16*a* and 16*b*, process them to remove from the sound signals SOL and SOR, the noise signals from the noise generating sources within the robot, and at the same time act each to detect a burst noise and to remove a signal portion in the sub-band containing the bust noise from the sound signal SOL, SOR from the outer microphone 16*a*, 16*b*, thereby taking out a real sound signal SL, SR cleared of noises, especially a burst noise as well.

This is followed by the frequency analysis by the pitch extracting section 25, 26 of the sound signal SL, SR to extract a relevant pitch on the sound with respect to all the sounds contained in the sound signal SL, SR to identify a harmonic structure of the relevant sound corresponding to this pitch as well as when it starts and ends, while providing acoustic data DL, DR for the left and right hand channel corresponding section 27.

And then, the left and right channel corresponding section 27 by responding to these acoustic data DL and DR makes a determination of the sound direction for each sound.

In this case, the left and right channel corresponding section 27 compares the left and right channels as regards the harmonic structure, e.g., in response to the acoustic data DL and DR, and contrast them by proximate pitches. Then, to achieve the contrast with greater accuracy, it is desirable to compare or contrast one pitch of one of the left and right channels not only with one pitch, but also with more than one pitches, of the other.

And, not only does the left and right channel corresponding section 27 compare assigned pitches by phase, but also it determines the direction of a sound by processing directional data for the sound by using the epipolar geometry based method mentioned earlier.

And then, the sound source separating section 28 in response to sound direction information from the left and right channel corresponding section 27 extract from the acoustic data DL and DR an acoustic data for each sound source to identify a sound of one sound source isolated from a sound of another sound source. Thus, the auditory system 20 is made capable of sound recognition and active audition by the sound separation into individual sounds from different sound sources.

In a nutshell, therefore, a humanoid robot of the present invention is so implemented in the form of embodiment illustrated 10 that the noise canceling circuits 24 and 24 cancel noises from sound signals SOL and SOR from the outer microphones 16*a* and 16*b* on the basis of sound signals SIL and SIR from the inner microphones 17*a* and 17*b* and at the same time removes a sub-band signal component that contains a bust noise from the sound signals SOL and SOR from the outer microphones 16*a* and 16*b*. This permits the outer microphones 16*a* and 16*b* in their directivity direction to be oriented by drive means to face a target emitting a sound and hence its direction to be determined with no influence received from the burst noise and by computation without using HRTF as in the prior art but uniquely using an epipolar geometry based method. This in turn eliminates the need to make any adjustment of the HRTF and re-measurement to meet with a change in the sound environment, can reduce the time of computation and further even in an unknown sound environment, is capable of accurate sound recognition upon separating a mixed sound into individual sounds from different sound sources or by identifying a relevant sound isolated from others.

Therefore, even in case the target is moving, simply causing the outer microphones 16*a* and 16*b* in their directivity direction to be kept oriented towards the target constantly following its movement allows performing sound recognition of the target. Then, with the left and right channel corresponding section 27 made to make a sound direction determination with reference to such directional information of the target derived e.g., from vision from a vision system among other perceptive systems 30, the sound direction can be determined with even more increased accuracy.

Also, if the vision system is to be included in the other perceptive systems 30, the left and right channel corresponding section 27 itself may be designed to furnish the vision system with sound direction information developed thereby. The vision system making a target direction determination by image recognition is then made capable of referring to a sound related directional information from the auditory system 20 to determine the target direction with greater accuracy, even in case the moving target is hidden behind an obstacle and disappears from sight.

Specific examples of experimentation are given below.

Figure 9:
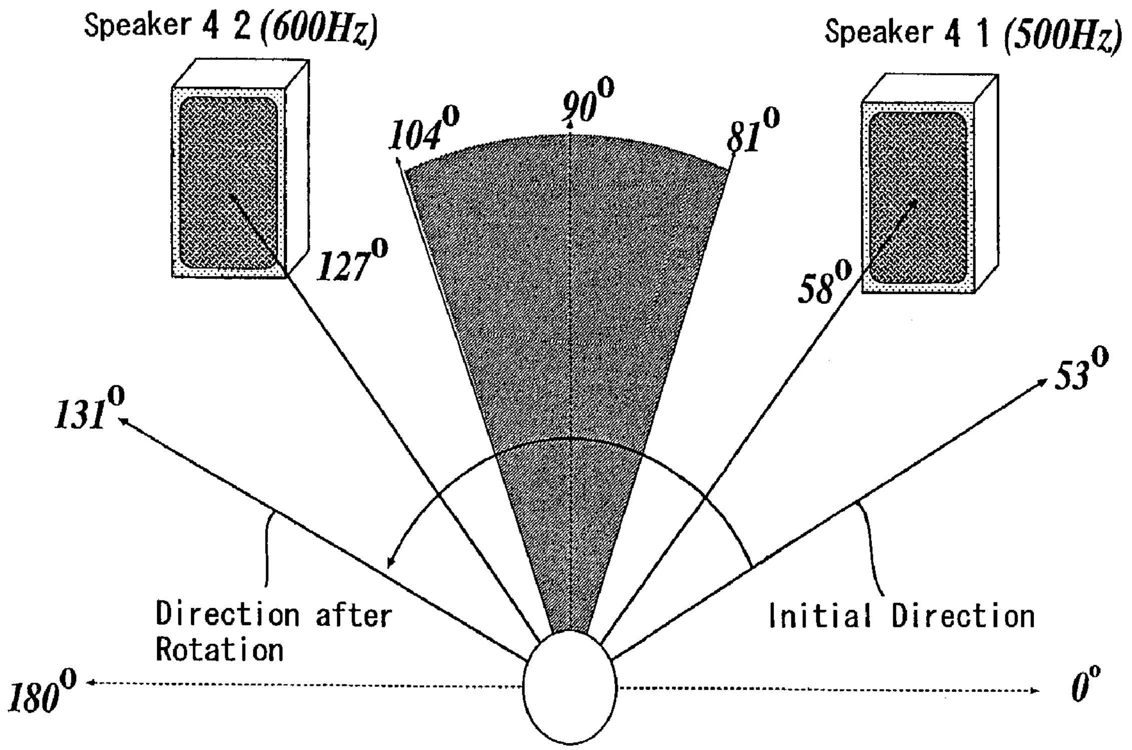
FIG. 9 is a diagrammatic view illustrating an example of experimentation testing the robot auditory system shown in FIG. 4.

As shown in FIG. 9, the humanoid robot 10 mentioned above stands opposite to loudspeakers 41 and 42 as two sound sources in a living room 40 of 10 square meters. Here, the humanoid robot 10 puts its head 13 initially towards a direction defined by an angle of 53 degrees turning counterclockwise from the right.

On the other hand, one speaker 41 reproduces a monotone of 500 Hz and is located at 5 degrees left ahead of the humanoid robot 10 and hence in an angular direction of 58 degrees, while the other speaker 42 reproduces a monotone of 600 Hz and is located at 69 degrees left of the speaker 41 as seen from the humanoid robot 10 and hence in an angular direction of 127 degrees. The speakers 41 and 42 are each spaced from the humanoid robot 10 by a distance of about 210 cm.

Here, with the came 15 of the humanoid robot 10 having its visual field horizontally of about 45 degrees, the speaker 42 is invisible to the humanoid robot 10 at its initial position by the camera 15.

Starting with this state, an experiment is conducted in which the speaker 41 first reproduces its sound and then the speaker 42 with a delay of about 3 seconds reproduces its sound. The humanoid robot 10 by audition determines a direction of the sound from the speaker 42 to rotate its head 13 to face towards the speaker 42. And the, the speaker 42 as a sound source and the speaker 42 as a visible object are correlated. The head 13 after rotation lies facing in an angular direction of 131 degrees.

Figure 10:
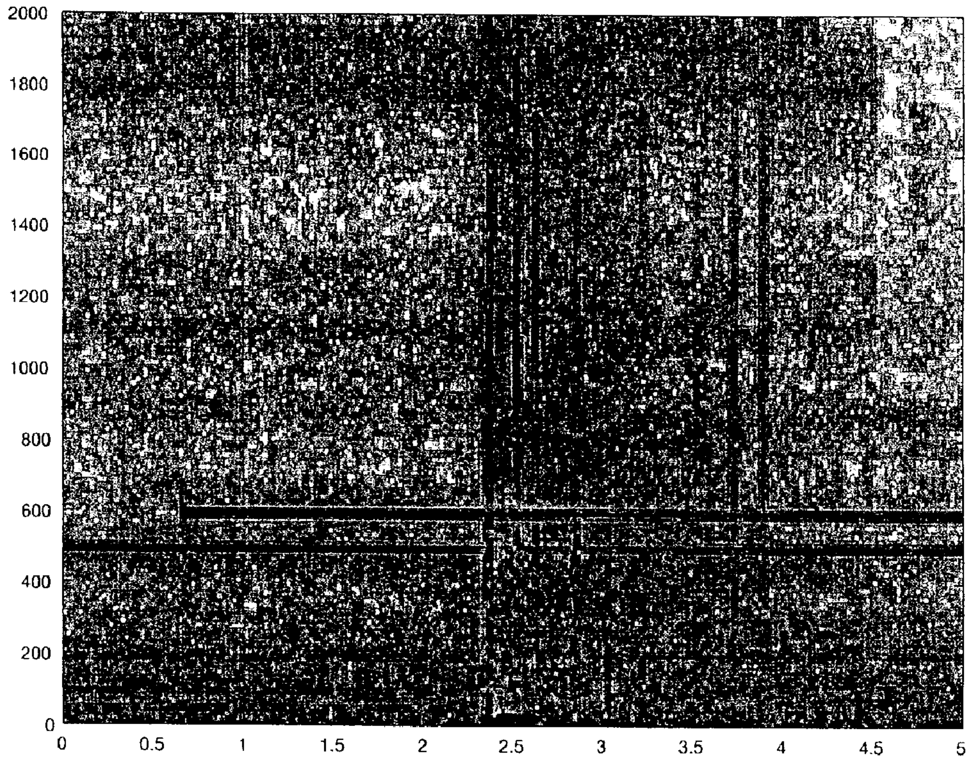
FIGS. 10A and 10B are spectrograms of input signals applied in the experiment shown in FIG. 9 to cause the head of the robot to move (A) rapidly and (B) slowly, respectively.
Figure 10:
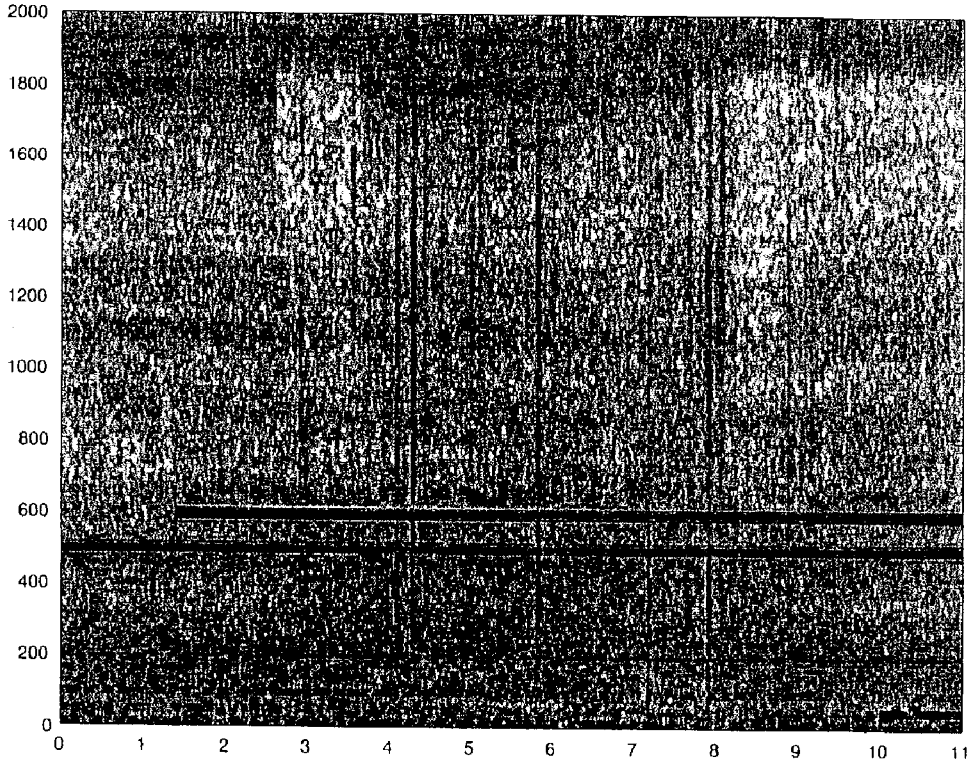

In the experiment, tests are conducted under difference conditions as to the speed of rotary movement of the head 13 of the humanoid robot 10 and the strength of noises in S/N ratio, namely the head 13 is rotated fast (68.8 degrees/second) and slowly (14.9 degrees/second); and with noises as week as 0 dB (equal in power to an internal sound in the standby state) and with noises as strong as about 50 dB (burst noises). Test results are obtained as follows:

FIGS. 10A and 10*b* are spectrograms of an internal sound by noises generated within the humanoid robot 10 when the movement is fast and slow, respectively. These spectrograms clearly indicate burst noises generated by driving motors.

Figure 11:
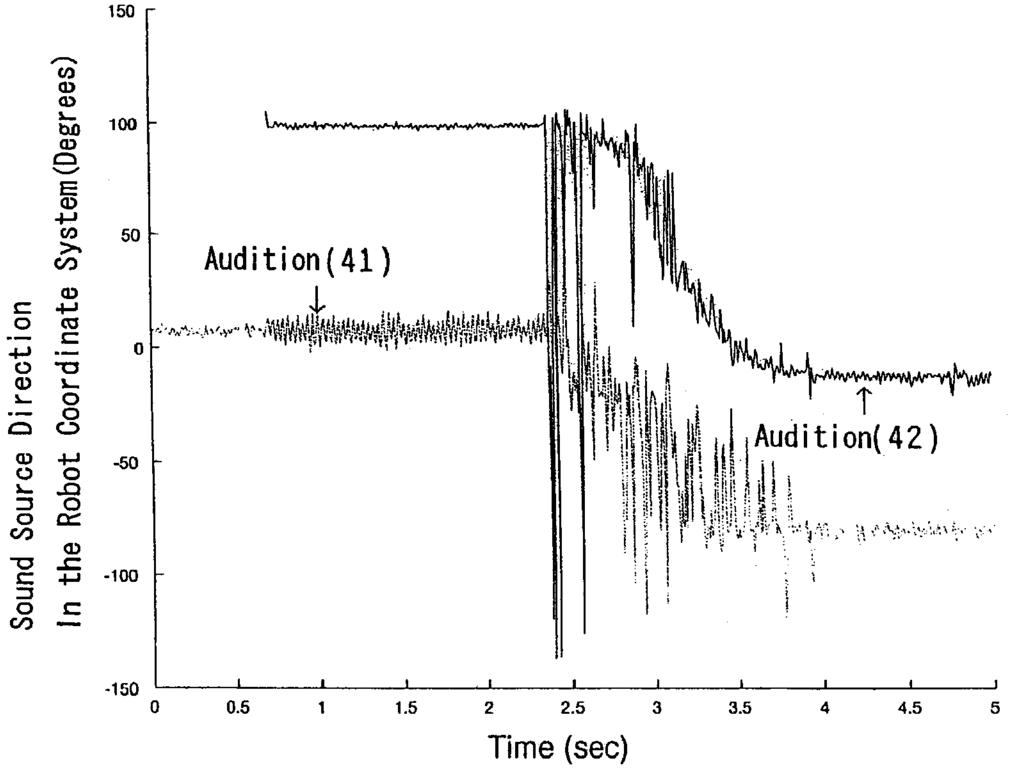
FIGS. 11A and 11B are graphs indicating directional data, respectively, in case the robot head is moved rapidly without removing a burst noise in the experiment of FIG. 9 and in case the robot head is moved there slowly.
Figure 11:
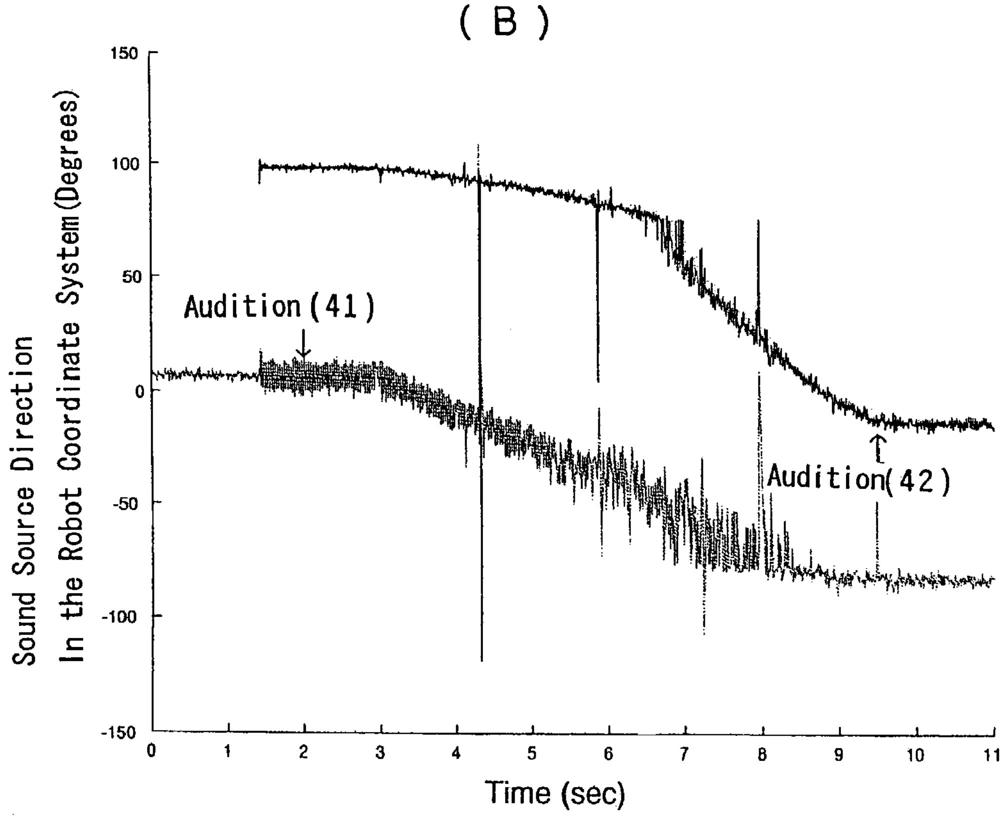

It is found that the directional information by the conventional noise suppression technique is taken out as largely affected by noises while the head 13 is being rotated (for a time period of 5 to 6 seconds) as shown in FIG. 11A or 11B, and while the humanoid robot 10 is driving to rotate the head 13 to trace a sound source, noises are generated such that its audition becomes nearly invalid.

Figure 12:
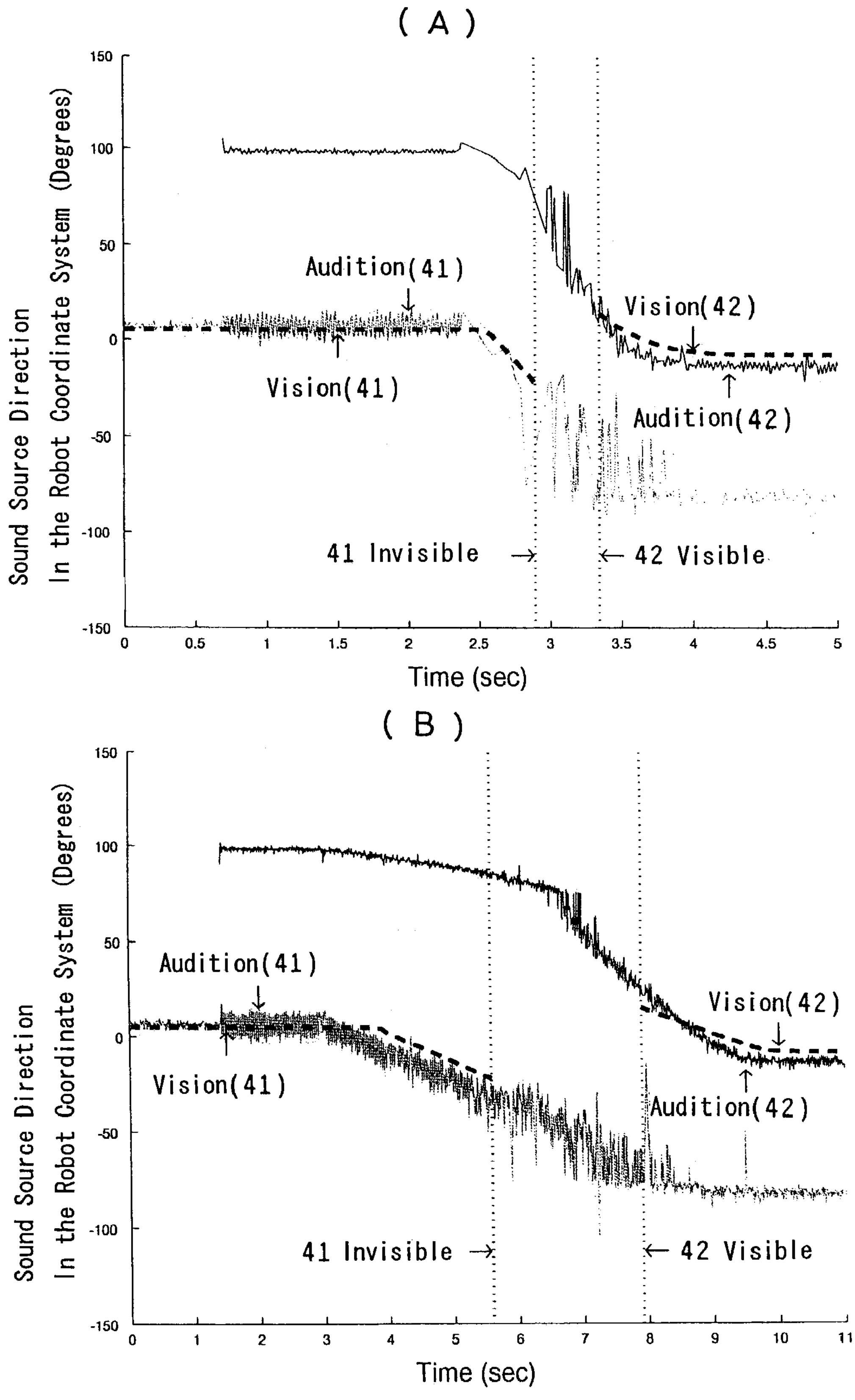
FIGS. 12A and 12B are graphs indicating directional data, respectively, in case the robot head is moved rapidly while removing a weak burst noise, in the experiment of FIG. 9 and in case the robot head is moved there slowly.
Figure 13:
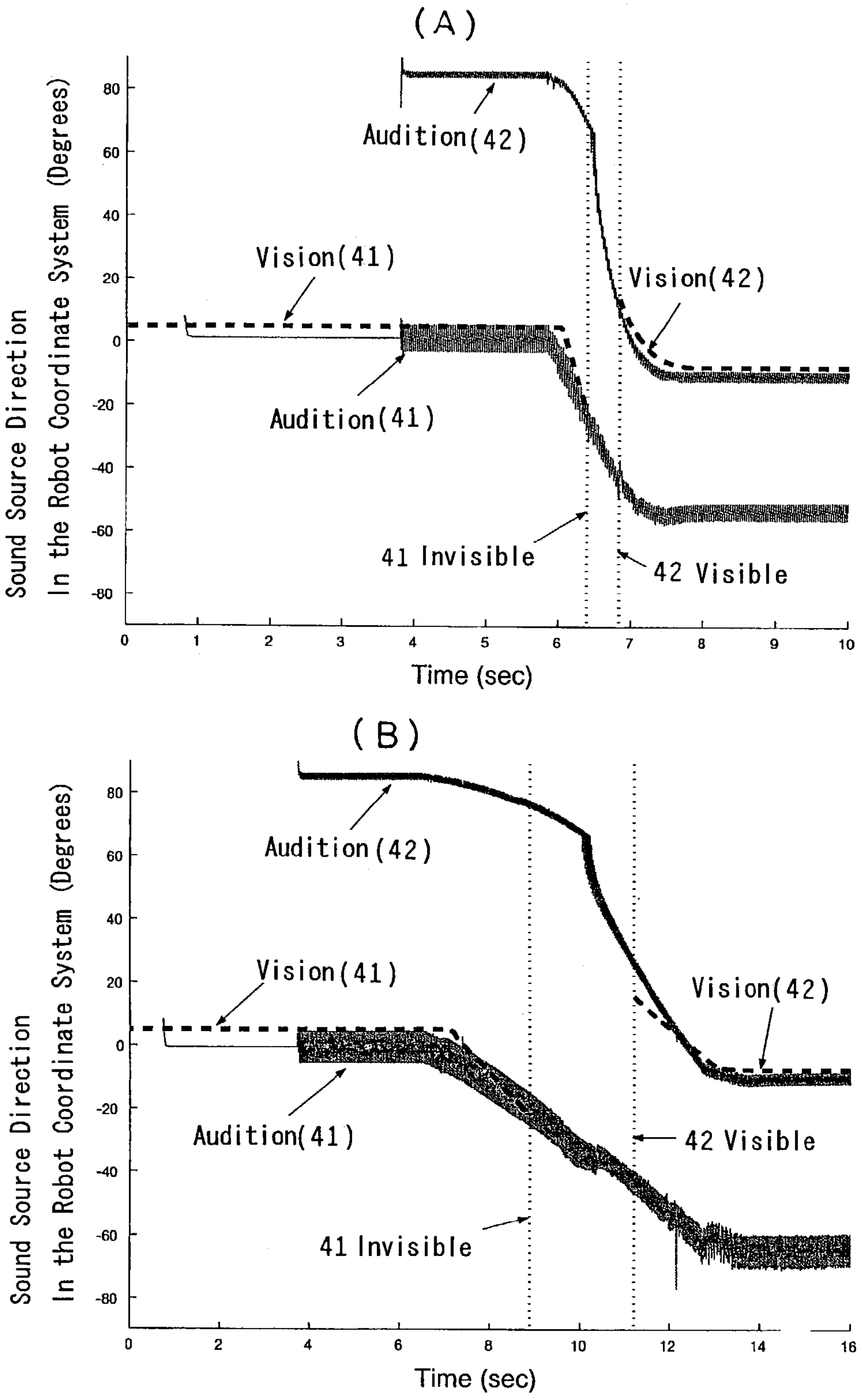
FIGS. 13A and 13B are graphs indicating directional data, respectively, in case the robot head is moved rapidly while removing a strong burst noise, in the experiment of FIG. 9 and in case the robot head is moved there slowly.
Figure 14:
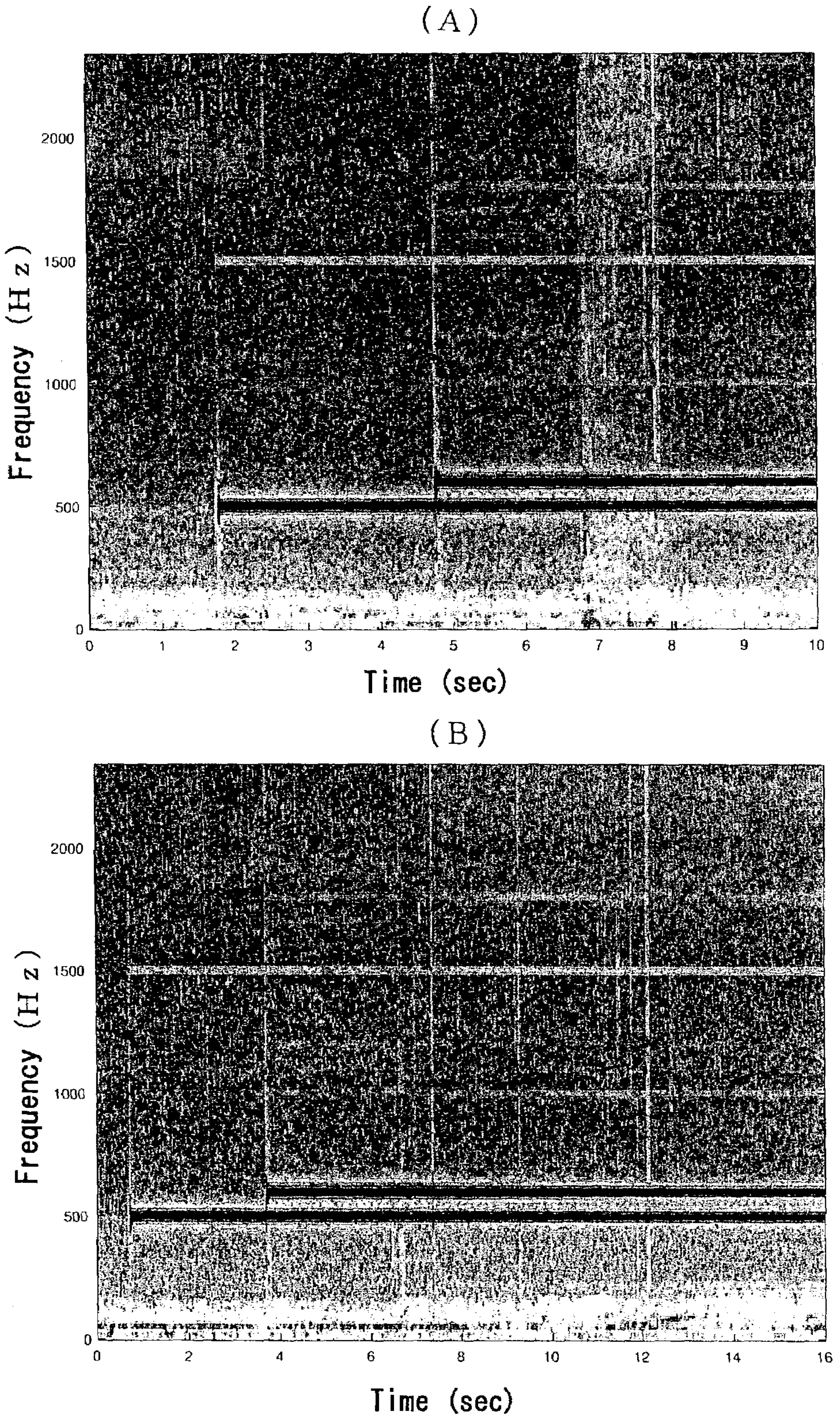
FIGS. 14A and 14*b* are spectrograms corresponding to the cases of FIGS. 13A and 13B, respectively, wherein the signal is stronger than the noise.

In contrast, the noise cancellation according to the present invention as shown in FIG. 12 for the case with weak noises and FIG. 13 even for the case with strong noises is seen to give rise to accurate directional information practically with no influence received from burst noises while the head 13 is being rotationally driven. FIGS. 14A and 14B are spectrograms corresponding to FIGS. 13A and 13B, respectively and indicate the cases that signals are stronger than noises.

While the noise canceling circuits 23 and 24 as mentioned previously eliminates burst noises on determining whether a bust noise exists or not for each of the sub-bands on the basis of sound signals SIL and SIR, such busts noises can be eliminated on the basis of sound properties of the cladding 14 as mentioned below.

Thus in the second burst noise canceling method, any noise input to a microphone is treated as a bust noise if it meets with the following sine qua non:

(1) A difference in strength between outer and inner microphones 16*a* and 17*a*; 16*b* and 17*b* is close to a difference in noise intensity of drive means such as template motors;

(2) The spectra in intensity and pattern of input sounds to the outer and inner microphones are dose to those of the noise frequency response of the template motors;

(3) Drive means such a motor is driving.

In the second burst noise canceling method, therefore, it is necessary that the noise canceling circuits 23 and 24 be beforehand stored as a template with sound data derived from measurements for various drive means when operated in the robot 10 (as shown in FIGS. 15A, 15B, 16A and 16B to be described later), namely sound signal data from the outer and inner microphones 16 and 17.

Subsequently, the noise canceling circuit 23, 24 acts on the sound signal SIL, SIR from the inner microphone 17*a*, 17*b* and the sound signal from the outer microphone 16*a*, 16*b* for each sub-band to determine if there is a burst noise using the sound measurement data as a template. To wit, the noise canceling circuit 23, 24 determines the presence of a burst noise and removes the same if the pattern of spectral power (or sound pressure) differences of the outer and inner microphones is found virtually equal to the pattern of spectral power differences of noises by the drive means in the measured sound measurement data, if the spectral sound pressures and pattern to vertically coincide with those in the frequency response measured of noises by the drive means, and further if the drive means is in operation.

Figure 15:
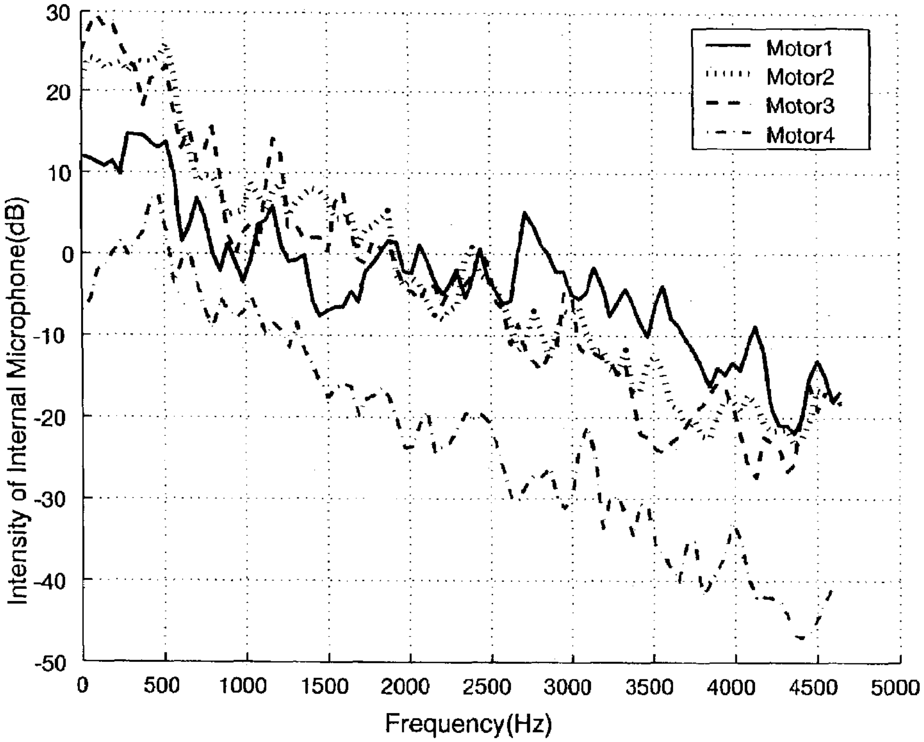
FIGS. 15A and 15B are graphs indicating frequency responses had for noises of drive means by inner and outer microphones, respectively.
Figure 15:
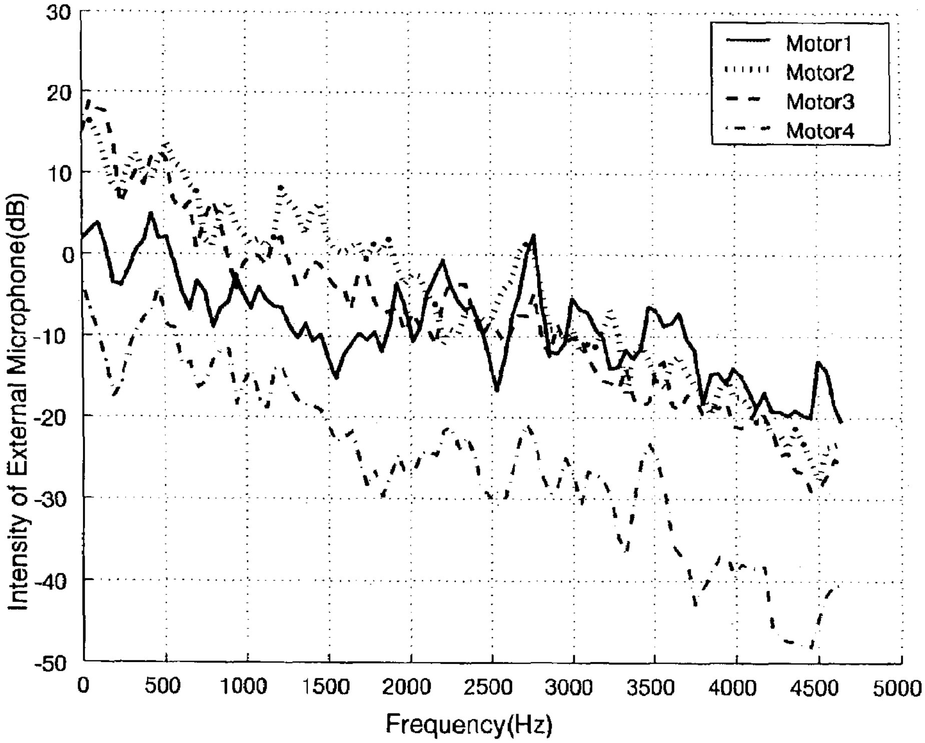
Figure 16:
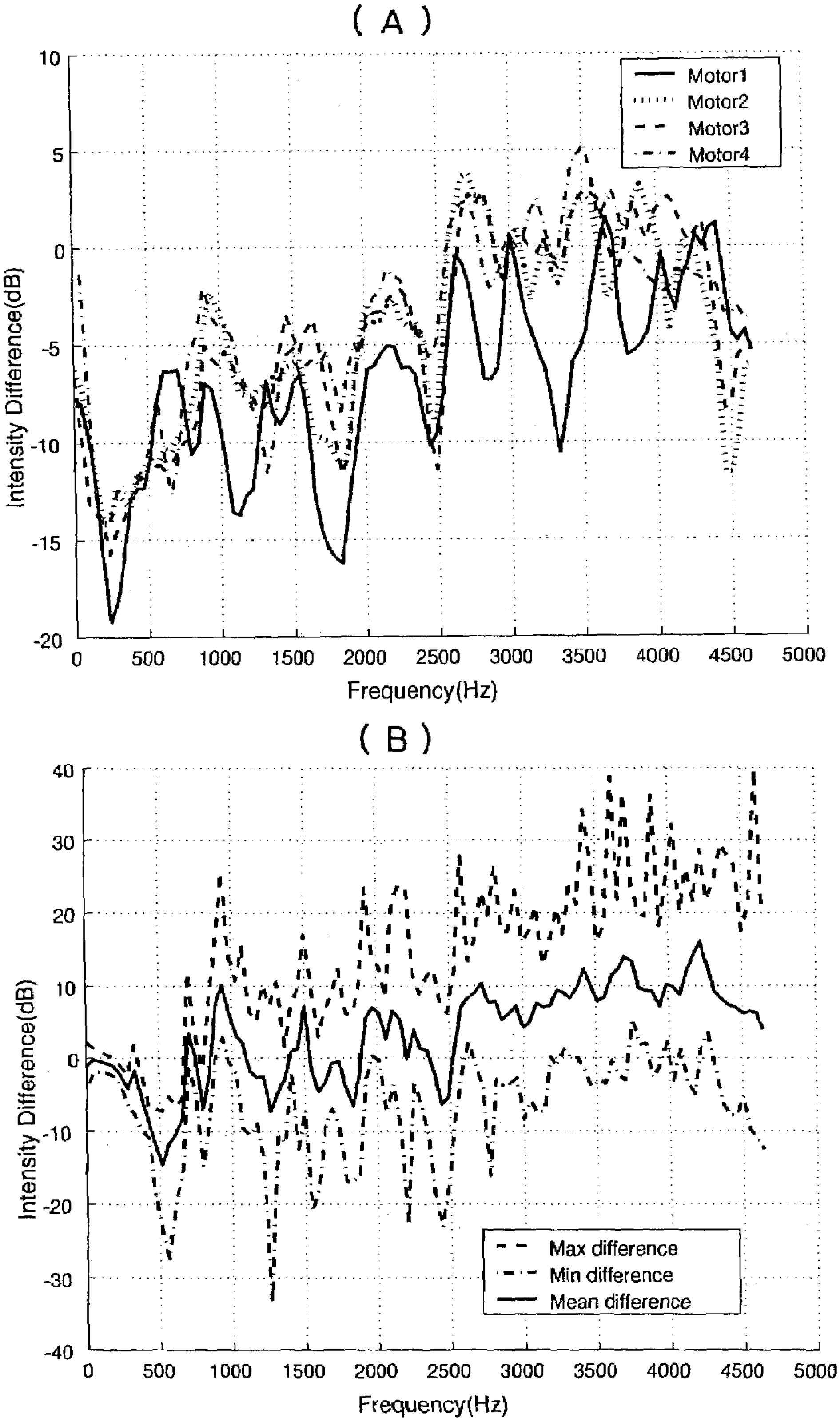
FIG. 16A is a graph indicating noises of the drive means in the frequency responses of FIG. 15
FIG. 16B is a graph indicating a pattern of the spectrum power difference of an external sound.

Such a determination of burst noises is based on the following reasons: Sound properties of the cladding 14 are measured in a dead or anechoic room. Items then measured of sound properties are as follows: The drive means for the clad robot 10 are a first motor (Motor 1) for swinging the head 13 in a front and back direction, a second motor (Motor 2) for swinging the head 13 in a left and right direction, a third motor 3 (Motor 3) for rotating the head 13 about a vertical axis and a fourth motor (Motor 4) for rotating the body 12 about a vertical axis. The frequency responses by the inner and outer microphones 17 and 16 to the noises generated by these motors are as shown in FIGS. 15A and 15B, respectively. Also, the pattern of spectral power differences of the inner and outer microphones 17 and 16 is as shown in FIG. 16A, and obtained by subtracting the frequency response by the inner microphone from the frequency response by the outer microphone. Likewise, the pattern of spectral power differences of an external sound is as shown in FIG. 16B. This is obtained by an impulse response wherein measurements are made at horizontal and vertical matrix elements, namely here at 0, ±45, ±90 and ±180 degrees horizontally from the robot center and at 0 and 30 degrees vertically, at 12 points in total.

From these drawing Figures, what follows is observed.

(1) As to noises by the drive means (motors) which are of broad band, signals from the inner microphones are greater by about 10 dB than signals from the outer microphones as shown in FIGS. 15A and 15B.

(2) As to noises by the drive means (motors), as shown in FIG. 16A signals from the outer microphones are somewhat greater or equal to signals from the inner microphones for frequencies of 2.5 kHz or higher. This indicates that the cladding 14 applied to shut off an external sound makes the inner microphones easier to pick up noises by the drive means.

(3) As to noises by the drive means (motors), signals from the inner microphones tend to be slightly greater than those from the outer microphones for frequencies of 2 kHz or lower, and this tendency is eminent for frequencies or 700 Hz or lower as shown in FIG. 16B. This appears to indicate a resonance inside of the cladding 14, which with the cladding 14 having a diameter of about 18 cm corresponds to $\lambda/4$ at a frequency of 500 Hz. Such resonances are shown to occur also in FIG. 16A.

(4) A comparison of FIGS. 15A and 15B indicates that internal sounds are greater than external sounds by about 10 dB. Therefore, the separation efficiency of the cladding 14 for internal and external sounds is about 10 dB.

In this manner, stored in advance with a pattern of spectral power differences of the outer and inner microphones and sound pressures and a pattern thereof in a spectrum containing a peak due to a resonance and hence retaining measurement data made for noises by drive means, the noise canceling circuit 23, 24 is made capable of determining the presence of a burst noise for each of sub-bands and then removing a signal portion corresponding to a sub-band in which a burst noise is found to exist, thereby eliminating the influence of burst noises.

A similar example of experimentation to that mentioned above is given below.

In this case, an experiment is conducted under the conditions identical to those in the experiment mentioned earlier, especially in moving the robot slowly at a rotational speed of 14.9 degrees/second to give rise to results mentioned below.

Figure 17:
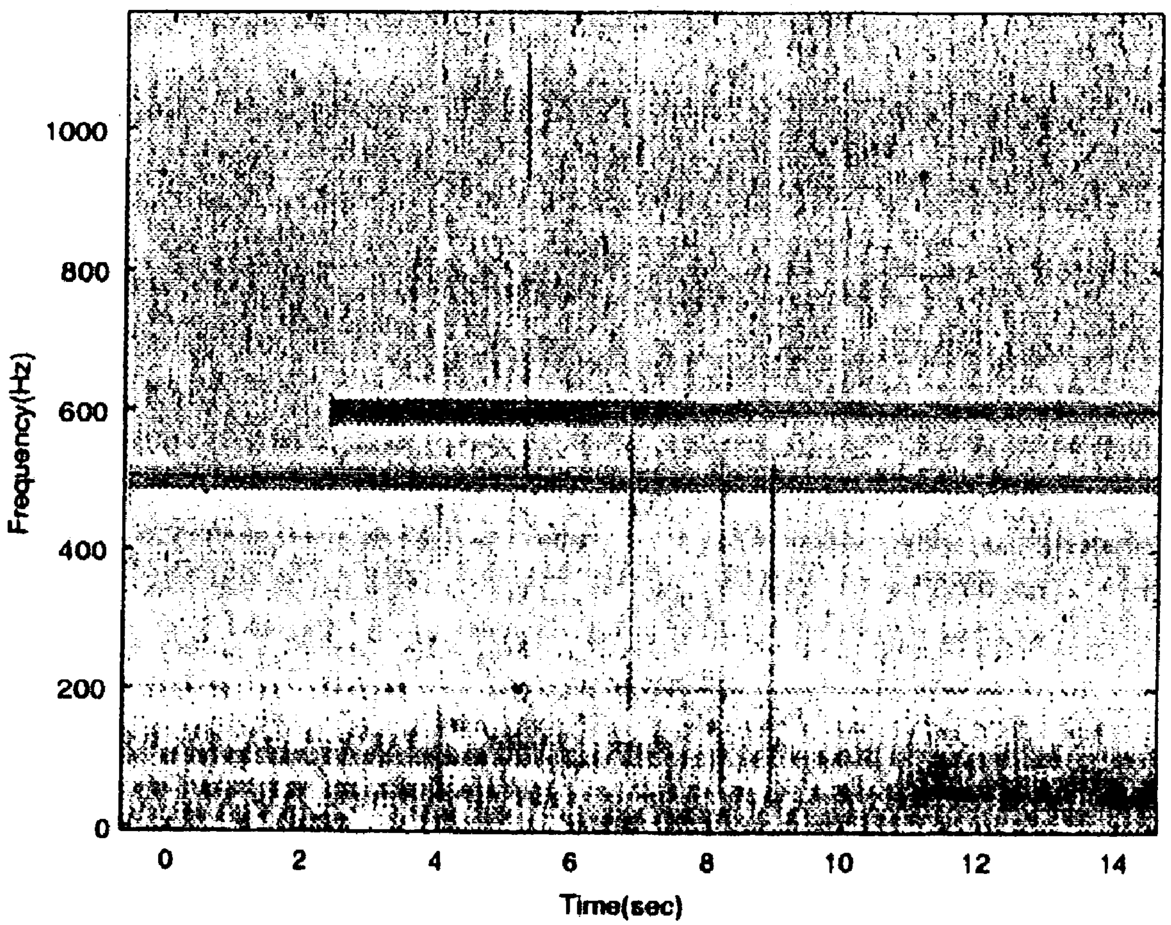
FIG. 17 is a spectrogram of an input signal in case the robot head is moving slowly.

FIG. 17 shows the spectrogram of internal sounds (noises) generated within the humanoid robot 10. This spectrogram clearly shows burst noises by drive motors.

Figure 18:
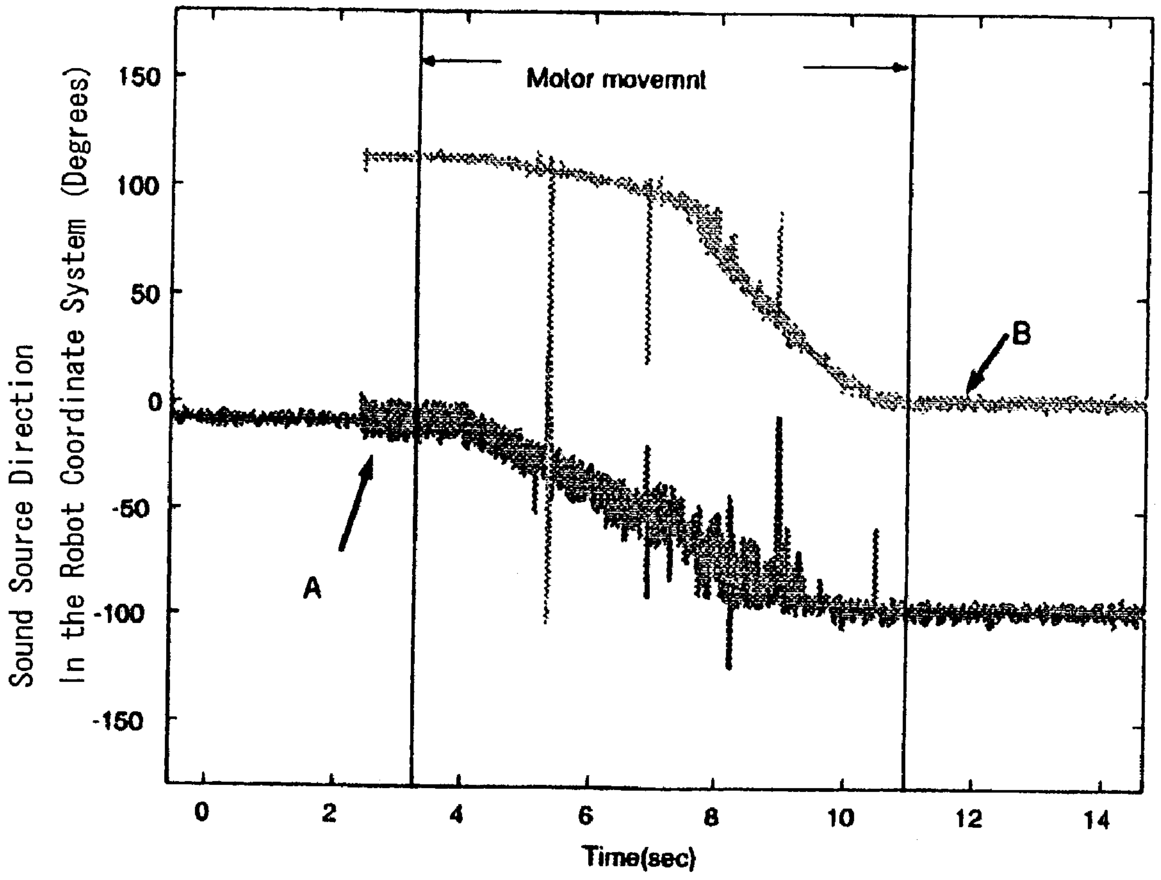
FIG. 18 is a graph indicating directional data in case the burst signal is not removed.

As is seen from FIG. 18, the directional information that ensues absent the noise cancellation is affected by the noises while the head 13 is being rotated, and while the humanoid robot 10 is driving to rotate the head 13 to trace a sound source, noises are generated such that its audition becomes nearly invalid.

Figure 19:
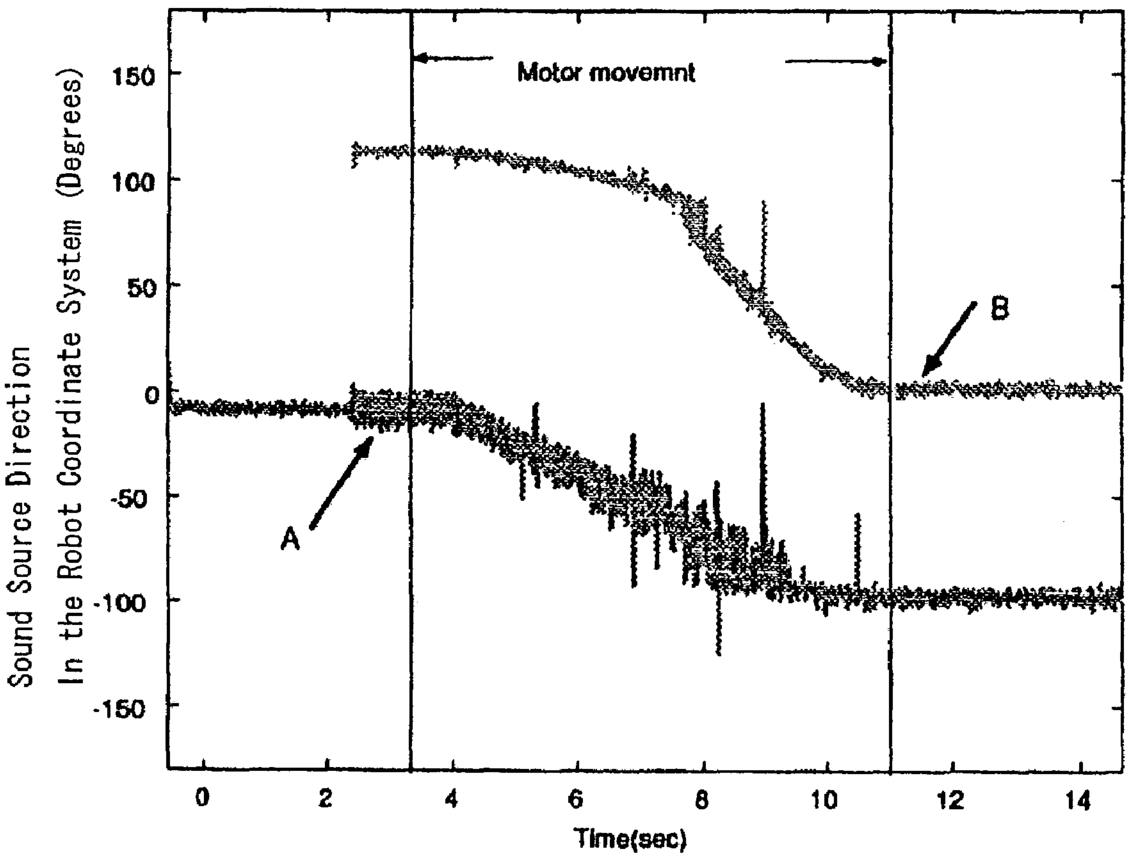
FIG. 19 is a graph indicating directional data derived from a first burst nose removing method as in the experiment of FIG. 9.

Also, if obtained according to the first noise canceling method mentioned previously, it is seen from FIG. 19 that the directional information has its fluctuations significantly reduced and thus is less affected by burst noises even while the head 13 is being rotationally driven; hence it is found to be comparatively accurate.

Figure 20:
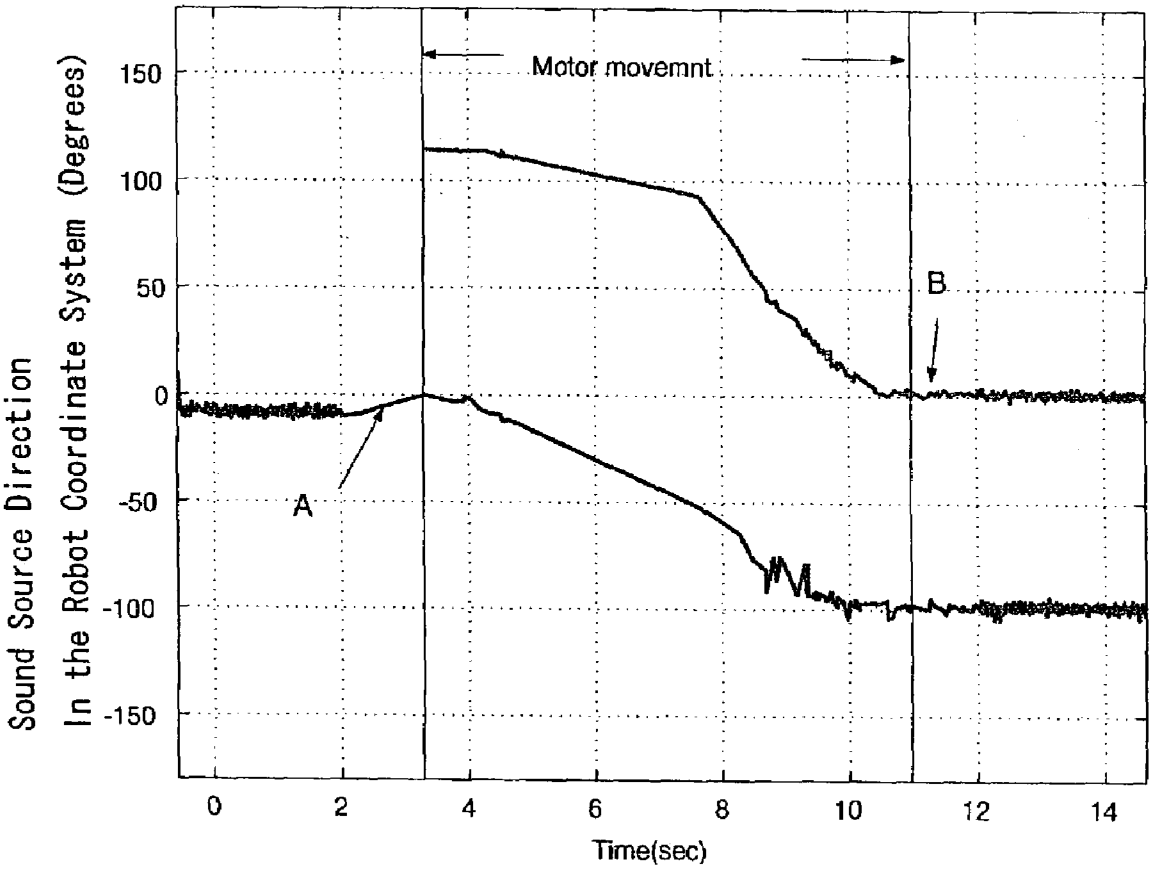
FIG. 20 is a graph indicating directional data derived from a second burst noise removing method.

Further, if obtained according to the second noise canceling method mentioned above, it is seen from FIG. 20 that the directional information has its fluctuations due to burst noises reduced to a minimum even while the head 13 is being rotationally driven; hence it is found to be even more accurate.

Apart from the experiments mentioned above, attempts have been made to make noise cancellation utilizing the ANC method (using FIR filters as adaptive filters), but it has not been found possible then to effectively cancel burst noises.

Although in the form of embodiment illustrated, the humanoid robot 10 has been shown as made up to possess four degrees of freedom (4FOF), it should be noted that this should not be taken as a limitation. It should rather be apparent that a robot auditory system of the present invention is applicable to such a robot as made up to operate in any way as desired.

Also, while in the form of embodiment illustrated, a robot auditory system of the present invention has been shown as incorporated into a humanoid robot 10, it should be noted that this should not be taken as a limitation, either. As should rather be apparent, a robot auditory system may also be incorporated into an animal-type, e.g., dog, robot and any other type of robot as well.

Further, while in the form of embodiment illustrated, the inner microphone means 17 has shown to be made of a pair of microphones 17*a* and 17*b*, it may be made of one or more microphones.

Also, while in the form of embodiment illustrated, the outer microphone means 16 has shown to be made of a pair of microphones 16*a* and 16*b*, it may be made of one or more pair of microphones.

The conventional ANC technique, which runs so filtering sound signals as affecting phases in them, inevitably causes a phase shift in them and as a result has not been adequately applicable to an instance where sound source localization should be made with accuracy. In contrast, the present invention, which avoids such filtering as affecting sound signal phase information and avoids using portions of data having noises mixed therein, proves suitable in such sound source localization.

INDUSTRIAL APPLICABILITY

As will be apparent from the foregoing description, the present invention provides an extremely eminent robot auditory apparatus and system made capable of attaining active perception upon collecting a sound from an external target with no influence received from noises generated interior of the robot such as those emitted from the robot driving elements.

What is claimed is:

1. A robot auditory apparatus for a robot having a noise generating source in its interior, characterized in that it comprises:

a sound insulating cladding with which at least a portion of the robot is covered;

at least two outer microphones disposed outside of said cladding for primarily collecting an external sound;

at least one inner microphone disposed inside of said cladding for primarily collecting noises from said noise generating source in the robot interior;

a processing section responsive to signals from said outer and inner microphones for canceling from respective sound signals from said outer microphones, noises signal from said interior noise generating source while detecting burst noises owing to said noise generating source from a signal from said at least one inner microphone for canceling signal portions from said sound signals for bands containing said burst noises; and a directional information extracting section responsive to a left and a right sound signals from said processing section for determining a direction from which said external sound is emitted.

2. A robot auditory apparatus for a robot having a noise generating source in its interior, characterized in that it comprises:

a sound insulating cladding for self-recognition with which at least a portion of the robot is covered;

at least two outer microphones disposed outside of said cladding for primarily collecting an external sound;

at least one inner microphone disposed inside of said cladding for primarily collecting noises from said noise generating source in the robot interior;

a processing section responsive to signals from said outer and inner microphones for canceling from respective sound signals from said outer microphones, noise signals from said interior noise generating source while detecting burst noises owing to said noise generating source from a signal from said at least one inner microphone for canceling signal portions from said sound signals for bands containing said burst noises; and a directional information extracting section responsive to a left and a right sound signals from said processing section for determining a direction from which said external sound is emitted.

3. A robot auditory apparatus as set forth in claim 1 or claim 2, characterized in that said processing section is adapted to remove such signal portions as burst noises if a sound signal from said at least one inner microphone is enough larger in power than a corresponding sound signal from said outer microphones and further if peaks exceeding a predetermined level are detected over said bands in excess of a preselected level.

4. A robot auditory apparatus as set forth in claim 1 or claim 2, characterized in that said directional information extracting section is adapted to determine the direction from which said external sound is emitted by processing directional information of the sound in accordance with auditory epipolar geometry.

5. A robot auditory apparatus as set forth in claim 1 or claim 2, characterized in that said directional information extracting section is adapted to determine the direction from which said external sound is emitted by processing directional information of the sound in accordance with an auditory epipolar geometry based method and, if the sound has a harmonic structure, upon isolating the sound from another sound with the use of such a harmonic structure and by using information as to a difference in intensity between sound signals.

6. A robot auditory system for a robot having a noise generating source in its interior, characterized in that it comprises:

a sound insulating cladding with which at least a portion of the robot is covered;

at least two outer microphones disposed outside of said cladding for collecting external sounds primarily;

at least one inner microphone disposed inside of said cladding for primarily collecting noises from said noise generating source in said robot interior;

a processing section responsive to signals from said outer and inner microphones for canceling from respective sound signals from said outer microphones, noise signals from said interior noise generating source while detecting burst noises owing to said noise generating source from a signal from said at least one inner microphone for canceling signal portions from said sound signals for bands containing said burst noises;

a pitch extracting section for effecting a frequency analysis on each of the a left and a right sound signals from said processing section to provide sound data as to time, frequency and power thereof from a pitch accompanied harmonic structure which the sound data signifies;

a left and right channel corresponding section responsive to left and right sound data from said pitch extracting section for providing respective sets of directional information determining directions from which the sounds are emitted, respectively; and a sound source separating section for splitting said sound data into those sound data for respective sound sources of said sounds on the basis of such harmonic structures or said sets of directional information provided by said left and right channel corresponding section.

7. A robot auditory system for a robot having a noise generating source in its interior, characterized in that it comprises:

a sound insulating cladding for self-recognition with which at least a portion of the robot is covered;

at least two outer microphones disposed outside of said cladding for collecting external sounds primarily;

at least one inner microphone disposed inside of said cladding for primarily collecting noises from said noise generating source in said robot interior;

a processing section responsive to signals from said outer and inner microphones for canceling from respective sound signals from said outer microphones, noise signals from said interior noise generating source while detecting burst noises owing to said noise generating source from a signal from said at least one inner microphone for canceling signal portions from said sound signals for bands containing said burst noises;

a pitch extracting section for effecting a frequency analysis on each of a left and a right sound signals from said processing section to provide sound data as to time, frequency and power thereof from a pitch accompanied harmonic structure which the sound data signifies;

a left and right channel corresponding section responsive to left and right sound data from said pitch extracting section for providing respective sets of directional information determining directions from which the sounds are emitted, respectively; and a sound source separating section for splitting said sound data into those sound data for respective sound sources of said sounds on the basis of such harmonic structures or said sets of directional information provided by said left and right channel corresponding section.

8. A robot auditory system for a humanoid or animaloid robot having a noise generating source in its interior, characterized in that it comprises:

a sound insulating cladding with which at least a head portion of the robot is covered;

at least a pair of outer microphones disposed outside of said cladding and positioned thereon at a pair of ear corresponding areas, respectively, of the robot for collecting external sounds primarily;

at least one inner microphone disposed inside of said cladding for primarily collecting noises from said noise generating source in said robot interior;

a processing section responsive to signals from said outer and inner microphones for canceling from respective sound signals from said outer microphones, noise signals from said interior noise generating source while detecting burst noises owing to said noise generating source from a signal from said at least one inner microphone for canceling signal portions from said sound signals for bands containing said burst noises;

a pitch extracting section for effecting a frequency analysis on each of a left and a right sound signals from said processing section to provide sound data as to time, frequency and power thereof from a pitch accompanied harmonic structure which the sound data signifies;

a left and right channel corresponding section responsive to left and right sound data from said pitch extracting section for providing respective sets of directional information determining directions from which the sounds are emitted, respectively; and a sound source separating section for splitting said sound data into those sound data for respective sound sources of said sounds on the basis of such harmonic structures or said sets of directional information provided by said left and right channel corresponding section.

9. A robot auditory system for a humanoid or animaloid robot having a noise generating source in its interior, characterized in that it comprises:

a sound insulating cladding for self-recognition with which at least a head portion of the robot is covered;

at least a pair of outer microphones disposed outside of said cladding and positioned thereon at a pair of ear corresponding areas, respectively, of the robot for collecting external sounds primarily;

at least one inner microphone disposed inside of said cladding for primarily collecting noises from said noise generating source in said robot interior;

a processing section responsive to signals from said outer and inner microphones for canceling from respective sound signals from said outer microphones, noise signals from said interior noise generating source while detecting burst noises owing to said noise generating source from a signal from said at least one inner microphone for canceling signal portions from said sound signals for bands containing said burst noises;

a pitch extracting section for effecting a frequency analysis on each of a left and a right sound signals from said processing section to provide sound data as to time, frequency and power thereof from a pitch accompanied harmonic structure which the sound data signifies;

a left and right channel corresponding section responsive to left and right sound data from said pitch extracting section for providing respective sets of directional information determining directions from which the sounds are emitted, respectively; and a sound source separating section for splitting said sound data into those sound data for respective sound sources of said sounds on the basis of such harmonic structures or said sets of directional information provided by said left and right channel corresponding section.

10. A robot auditory system as set forth in any one of claims 6 to 9, characterized in that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory information with the image and movement information.

11. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory directional information with the image and movement information; and that said left and right channel corresponding section is also adapted to furnish said other perceptual system or systems with the auditory directional information.

12. A robot auditory system as set forth in any one of claims 6 to 9, characterized in that said processing section is adapted to regard noises as the burst noises and remove signal portions for the bands containing those noises upon finding that a difference in intensity between the sound signals of said inner and outer microphones for said noises is close to an intensity in difference between those for template noises by robot drive means, that the spectral intensity and pattern of input sounds to said inner and outer microphone for said noises are close to those in a frequency response for the template noises by the robot drive means and further that the drive means is in operation.

13. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory information with the image and movement information; and that said processing section is adapted to regard noises as the burst noises and remove signal portions for the bands containing those noises upon finding that a difference in intensity between the sound signals of said inner and outer microphones for said noises is close to an intensity in difference between those for template noises by the robot drive means, that the spectral intensity and pattern of input sounds to said inner and outer microphone for said noises are close to those in a frequency response for the template noises by the robot drive means and that the drive means is in operation.

14. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory information with the image and movement information;

that said left and right channel corresponding section is also adapted to furnish said other perceptual system or systems with the auditory directional information; and that said processing section is adapted to regard noises as the burst noises and remove signal portions for the bands containing those noises upon finding that a difference in intensity between the sound signals of said inner and outer microphones for said noises is close to an intensity in difference between those for template noises by the robot drive means, that the spectral intensity and pattern of input sounds to said inner and outer microphone for said noises are close to those in a frequency response for the template noises by the robot drive means and that the drive means is in operation.

15. A robot auditory system as set forth in claim 8 or claim 9, characterized in that said processing section is adapted to regard noises as the burst noises and remove signal portions for the bands containing those noises upon finding that the pattern of spectral power differences between the sound signals from said outer and inner microphones is substantially equal to a pattern of those measured in advance for noises by robot drive means, that the spectral sound pressures and their pattern are substantially equal to those in a frequency response measured in advance for noises by the drive means and that a control signal for the drive means indicates that the drive means is in operation.

16. A robot auditory system as set forth in any one of claims 6 to 9, characterized in that said left and right channel corresponding section is adapted to derive said sets of directional information by computation in accordance with auditory epipolar geometry, thereby determining the directions from which said sounds are emitted, respectively.

17. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory directional information with the image and movement information; and that said left and right channel corresponding section is also adapted to derive said sets of directional information by computation in accordance with auditory epipolar geometry, thereby determining the directions from which said sounds are emitted, respectively.

18. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory directional information with the image and movement information;

that said left and right channel corresponding section is also adapted to furnish said other perceptual system or systems with the auditory directional information; and that said left and right channel corresponding section is further adapted to derive said sets of directional information by computation in accordance with auditory epipolar geometry, thereby determining the directions from which said sounds are emitted, respectively.

19. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory directional information with the image and movement information;

that said left and right channel corresponding section is also adapted to furnish said other perceptual system or systems with the auditory directional information;

that said processing section is adapted to regard noises as the burst noises and remove signal portions for the bands containing those noises upon finding that a difference in intensity between the sound signals of said inner and outer microphones for said noises is close to an intensity in difference between those for template noises by robot drive means, that the spectral intensity and pattern of input sounds to said inner and outer microphone for said noises are close to those in a frequency response for the template noises by the robot drive means and that the drive means is in operation; and that said left and right channel corresponding section is further adapted to derive said sets of directional information by computation in accordance with auditory epipolar geometry, thereby determining the directions from which said sounds are emitted, respectively.

20. A robot auditory system as set forth in claim 8 or claim 9, characterized in:

that said processing section is adapted to regard noises as the burst noises and remove signal portions for the bands containing those noises upon finding that the pattern of spectral power differences between the sound signals from said outer and inner microphones is substantially equal to a pattern of those measured in advance for noises by robot drive means, that the spectral sound pressures and their pattern are substantially equal to those in a frequency response measured in advance for noises by the drive means and that a control signal for the drive means indicates that the drive means is in operation; and that said left and right channel corresponding section is adapted to derive said sets of directional information by computation in accordance with auditory epipolar geometry, thereby determining the directions from which said sounds are emitted, respectively.

21. A robot auditory system as set forth in any one of claims 6 to 9, characterized in that said left and right channel corresponding section sound direction by processing directional information of the sound in accordance with an auditory epipolar geometry based method and, if the sound has a harmonic structure, upon isolating the sound from another sound with the use of such a harmonic structure and by using information as to a difference in intensity between sound signals.

22. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory directional information with the image and movement information; and that said left and right channel corresponding section is adapted to determine the sound direction by processing directional information of the sound in accordance with an auditory epipolar geometry based method and, if the sound has a harmonic structure, upon isolating the sound from another sound with the use of such a harmonic structure and by using information as to a difference in intensity between sound signals.

23. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory directional information with the image and movement information;

that said left and right channel corresponding section is adapted to furnish said other perceptual system or systems with the auditory directional information; and that said left and right channel corresponding section is also adapted to determine the sound direction by processing directional information of the sound in accordance with an auditory epipolar geometry based method and, if the sound has a harmonic structure, upon isolating the sound from another sound with the use of such a harmonic structure and by using information as to a difference in intensity between sound signals.

24. A robot auditory system as set forth in any one of claims 6 to 9, characterized in:

that said robot is further provided with one or more of other perceptual systems including vision and tactile systems furnishing an image of a sound source, and said left and right channel corresponding section is adapted to refer to image information from such system or systems as well to control signals for a drive means for moving the robot and thereby to determine the directions from which the sounds are emitted in coordinating the auditory directional information with the image and movement information;

that said left and right channel corresponding section is also adapted to furnish said other perceptual system or systems with the auditory directional information;

that said processing section is adapted to regard noises as the burst noises and remove signal portions for the bands containing those noises upon finding that a difference in intensity between the sound signals of said inner and outer microphones for said noises is close to an intensity in difference between those for template noises by the robot drive means, that the spectral intensity and pattern of input sounds to said inner and outer microphone for said noises are close to those in a frequency response for the template noises by the robot drive means and that the drive means is in operation; and that said left and right channel corresponding section is further adapted to determine the sound direction by processing directional information of the sound in accordance with an auditory epipolar geometry based method and, if the sound has a harmonic structure, upon isolating the sound from another sound with the use of such a harmonic structure and by using information as to a difference in intensity between sound signals.

25. A robot auditory system as set forth in claim 8 or claim 9, characterized in:

that said processing section is adapted to regard noises as the burst noises and remove signal portions for the bands containing those noises upon finding that the pattern of spectral power differences between the sound signals from said outer and inner microphones is substantially equal to a pattern of those measured in advance for noises by robot drive means, that the spectral sound pressures and their pattern are substantially equal to those in a frequency response measured in advance for noises by the drive means and that a control signal for the drive means indicates that the drive means is in operation; and that said left and right channel corresponding section is further adapted to determine the directions from which the sounds are emitted by processing directional information of the sound in accordance with an auditory epipolar geometry based method and, if the sound has a harmonic structure, upon isolating the sound from another sound with the use of such a harmonic structure and by using information as to a difference in intensity between sound signals.

* * * * *